United States Patent
Barua et al.

(10) Patent No.: US 10,034,029 B1
(45) Date of Patent: Jul. 24, 2018

(54) SYSTEMS AND METHODS FOR AUDIO OBJECT DELIVERY BASED ON AUDIBLE FREQUENCY ANALYSIS

(71) Applicant: Sprint Communications Company L.P., Overland Park, KS (US)

(72) Inventors: Abhik Barua, Overland Park, KS (US); Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/497,175

(22) Filed: Apr. 25, 2017

(51) Int. Cl.
| | |
|---|---|
| H04N 9/80 | (2006.01) |
| H04N 5/92 | (2006.01) |
| H04N 21/233 | (2011.01) |
| G10L 19/02 | (2013.01) |
| H04N 21/439 | (2011.01) |
| G06F 17/30 | (2006.01) |
| H04H 60/88 | (2008.01) |

(52) U.S. Cl.
CPC ....... *H04N 21/233* (2013.01); *G06F 17/3074* (2013.01); *G10L 19/02* (2013.01); *H04H 60/88* (2013.01); *H04N 21/2335* (2013.01); *H04N 21/4394* (2013.01)

(58) Field of Classification Search
USPC .................................. 386/241, 248, 337
See application file for complete search history.

(56) References Cited

U.S. PATENT DOCUMENTS

| | | | |
|---|---|---|---|
| 2016/0269762 A1* | 9/2016 | Inoue | G11B 27/10 |
| 2017/0229113 A1* | 8/2017 | Toyama | G10L 13/0335 |
| 2017/0245069 A1* | 8/2017 | Moriguchi | H04R 27/00 |

\* cited by examiner

*Primary Examiner* — Nigar Chowdhury

(57) ABSTRACT

A system for audio object delivery based on audible frequency analysis comprises a network server comprising non-transitory memory storing an application that, in response to execution, the network server: ingests a plurality of audio clip messages that each comprise metadata and an audio clip file. For at least one audio clip message, the network server reduces the audio clip file to a predefined time length, creates a plurality of time bins, determines that a first time bin and a second time bin correspond with a trigger sound frequency, generates a spectral flatness value, determines a frequency band identifier, and appends the generated spectral flatness value and the frequency band identifier to the audio clip message. The network server assigns the appended audio clip message to a voice matrix, identifies user equipment based on the voice matrix, and initiates delivery of an audio object to the identified user equipment.

20 Claims, 8 Drawing Sheets

SYSTEMS AND METHODS FOR AUDIO OBJECT DELIVERY BASED ON AUDIBLE FREQUENCY ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User Equipment (UE) (e.g., mobile communication devices) may include applications that respond to voice commands and operating systems that allow for transmission of information via application programming interfaces. Each UE may comprise a finite amount of local memory and processing resources. Applications running on the UE may expand their memory footprint when applications record environmental sounds that may or may not contain relevant frequencies, thus causing application bloating and may drain the UE's battery. A user may vocally interact around and/or with multiple devices from different manufacturers, and the user may have to repeat themselves if the device fails to recognize the sounds from the user, thereby causing additional processor execution cycles, increased battery consumption, and/or slower responses from the device.

SUMMARY

In an embodiment, a system for audio object delivery based on audible frequency analysis is disclosed. The system comprises a network server communicatively coupled to a telecommunications network. The network server comprises a non-transitory memory storing an application that, in response to execution, the network server ingests a plurality of audio clip messages that each comprise metadata and an audio clip file. For at least one audio clip message, the network server: reduces the audio clip file to a predefined time length; creates a plurality of time bins that collectively span the predefined time length of the audio clip file; determines that a first time bin and a second time bin correspond with a trigger sound frequency and that at least one time bin is located between the first time bin and second time bin along the predefined time length; generates a spectral flatness value based on the at least one time bin between the first time bin and the second time bin; determines a frequency band identifier corresponding to a frequency band present in the audio clip file; and appends, to the at least one audio clip message, the generated spectral flatness value and the frequency band identifier. In response to the at least one audio clip message being appended, the network server assigns the appended audio clip message to a voice matrix stored in a communicatively coupled data store. The network server identifies user equipment based on the voice matrix, where the user equipment did not provide the audio clip message to the network server. The network server initiates delivery of an audio object to the identified user equipment.

In an embodiment, a method for audio object delivery based on audible frequency analysis is disclosed. The method comprises ingesting, by a network server executing an application via a processor, a plurality of audio clip messages that each comprise metadata and an audio clip file. The method continues such that for at least one audio clip message of the plurality: the network server, by executing the application via a processor, is reducing the audio clip file to a predefined time length; creating a plurality of time bins that collectively span the predefined time length of the audio clip file; determining that a first time bin and a second time bin correspond with a trigger sound frequency and that at least one time bin is located between the first time bin and second time bin along the predefined time length; generating a spectral flatness value based on the at least one time bin between the first time bin and the second time bin; and determining a frequency band identifier corresponding to a frequency band present in the audio clip file. The method also include the network server appending, by executing the application via a processor, at least the generated spectral flatness value and the frequency band identifier to the at least one audio clip message. In response to the at least one audio clip message being appended, the network server, by executing the application via a processor, is assigning the appended audio clip message to a voice matrix stored in a communicatively coupled data store. The method continues with identifying, by the network server executing the application via a processor, user equipment based on the voice matrix, where the user equipment did not provide the audio clip message to the network server. The method includes initiating, by the network server executing the application via a processor, delivery of an audio object to the identified user equipment.

In an embodiment, another method for audio object delivery based on audible frequency analysis is disclosed. The method comprises: ingesting, by a network server executing an application via a processor, a plurality of audio clip messages that each comprise metadata and an audio clip file. The method continues such that for at least one audio clip message of the plurality: the network server, by executing the application via a processor, is creating a plurality of time bins that collectively span a predefined time length of the audio clip file; determining that a first time bin and a second time bin correspond with a trigger sound frequency; generating a spectral flatness value for sounds in the audio clip file; determining a frequency band identifier for each of a plurality of frequency bands determined to be present in the audio clip file, and appending at least the generated spectral flatness value and each frequency band identifier to the at least one audio clip message. In response to the at least one audio clip message being appended, the network server, by executing the application via a processor, is assigning the appended audio clip message to at least one of the plurality of voice matrices. The method includes identifying, by the network server executing the application via a processor, user equipment based on an association between the at least one voice matrix and a user profile. In response to a triggering event, the network server is initiating, by executing the application via a processor, delivery of an audio object to the identified user equipment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1A:
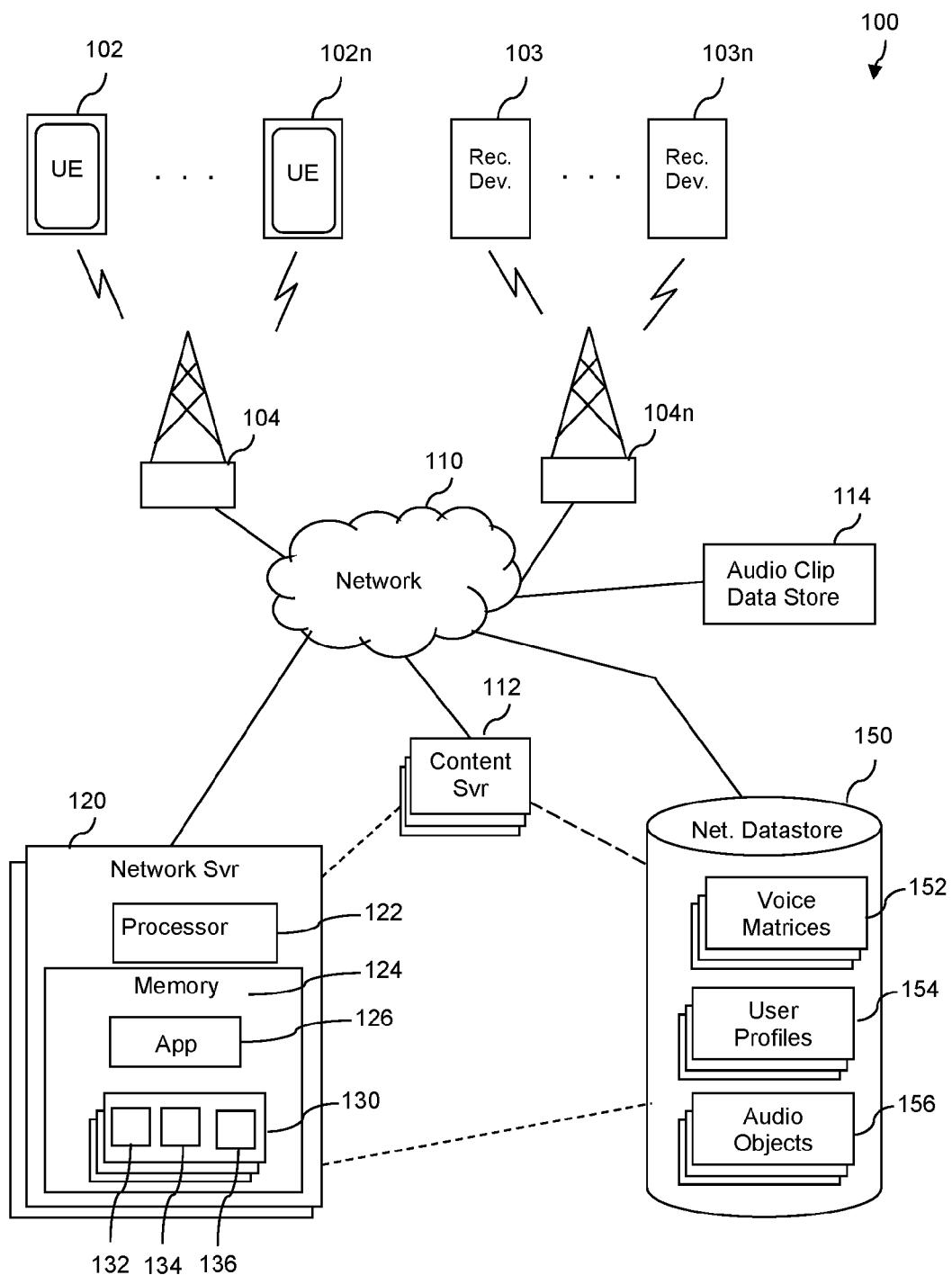
- FIG. 1A is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user may routinely carry and use their smart phone to search for information, schedule appointments, and interact with online services. In some instances, a user may also be in physical proximity to intelligent recording devices that respond to a user's verbal commands, such as a user making requests to the recording device so that the user can check the weather, create a calendar reminder, play music, or send a communication message without having to physically type out commands on a user interface. For example, recording devices may be configured to continuously listen for a particular word or phrase indicating that a user is addressing the recording device. Recording devices may be separate from the user's smart phone, such as a recording device 103 that is usually stationary in location (e.g., typically due to being located on a kitchen counter-top in a user's home). A recording device could be in a configuration such that it is transitory in location (e.g., due to being part of a vehicle's infotainment system and thus the recording device moves because of the vehicle's movement). Another configuration of a recording device may provide a hybrid of stationary and transitory in location (e.g., a user's wearable device that may sometimes be worn and other times be sitting on a dresser but still active, or an elevator that is sometimes stationary and other times is moving). Because a recording device may have different configurations as to its typical movement, the environmental sounds to which the recording device is exposed may differ, and thus the recorded signals and their frequencies may pertain to sounds produced by humans, animals, devices, and/or nature.

As more recording devices communicatively couple to networks and provide information to network servers, the amount of data handled by network servers can grow exponentially, thereby potentially causing bottlenecks in processing efficiency on the network servers due to the large volume of messages being sent to the network servers by hundreds, thousands, or even millions of recording devices. To improve processing efficiency, decrease response times, and provide a more robust user experience, the network servers may seek to rapidly distinguish between recorded sounds that were produced by humans in the environment in which the recording device is located versus sounds that were produced by non-humans. Additionally, in order to retrieve and deliver relevant information to particular devices coupled to the network, the network servers may benefit from systems and methods which enable the network servers to identify which user(s) was speaking when the sounds were recorded in audio clip files, and whether audio objects can be sent to user equipment that is associated with the user that was speaking and/or another user discussed in the recorded sounds. As such, embodiments of the present disclosure provide improvements to communication systems by reducing the time it may take for network servers to identify a user's voice in a recorded audio clip file and by providing efficient processes by which to delivery audio objects for execution on user equipment based on the network server's audible frequency analysis of recorded signals within audio clip files. Audible frequencies may be measured in hertz (Hz) and refer to the sounds that typically range from 20 Hz to 20,000 Hz.

By way of example, consider a scenario in which two persons (named Bob and Sally) are conversing in an environment in which a recording device is also present, such as in the living room of Sally's home where she has the recording device sitting on a piece of furniture. Additionally, the environment also contains a barking dog and a television that is playing a nightly news broadcast in which a news anchor is conducting an interview, where the television is producing sounds of the voices of both news anchor and interviewee. The recording device may be initiated to record sounds from the environment (whether in response to a trigger phrase or due to being in a continuous recording mode). While the recording device is recording the sounds of the environment, the dog is barking, the news anchor and interviewee are talking, and Bob and Sally are having a conversation. Bob may have asked Sally why the dog is barking, and Sally responded that the dog is hungry and asks Bob to buy more of a certain brand of dog food. Because the recording device belongs to Sally, she may have been the person who setup a user account and activated the recording device with a manufacturer or service provider under her name, and thus the recording device is configured to provide information (to network servers) that indicates the recording device belongs to Sally. Sally's recording device may capture the recorded sounds in an audio clip file and transmit an audio clip message to an audio clip data store for storage in memory, where the audio clip message contains metadata and the audio clip file having the recorded sounds from Bob, Sally, the barking dog, and the voices of the news anchor and interviewee produced by the television.

Embodiments of the present disclosure may provide a network server that is configured by an application to access the audio clip data store and ingest the audio clip message, which has an audio clip file contained therein. The network server may determine that the audio clip file can be played back over a predefined length of ten seconds. To segment the sounds along the length of time, the network server creates a plurality of time bins, such as five time bins that are each two seconds in length. The network server may determine that the audio clip file has five recorded sound signals (one for each of Bob's voice, Sally's voice, the dog's barking sound, the news anchor speaking on the television, and the interviewee on the television), and that each of the sound signals are contained in three of the five time bins. The network server may determine that each of the recorded sound signals have frequencies above a trigger sound frequency, such as each of the sound signals have frequencies above 20 Hz. The network server may use the trigger sound frequency (in Hz) as a base threshold frequency so as to streamline analysis by not considering frequencies below the trigger sound frequency because they have a high probability of not being produced by a human. The trigger sound frequency may be a value stored in a data file accessible to the network server.

For the frequencies above the trigger sound frequency, the network server may be configured to distinguish which sound signals pertain to the humans speaking in the environment, which pertain to sounds from the television, and the sound produced by non-humans (e.g., animals). The sound signals which are determined to be produced by humans in the environment may be the basis for audio object delivery via the network. In this example, the network server may seek to determine which sound signal in the audio clip file pertains to Bob and Sally, and which pertain to the barking dog and the television. To accomplish this, the network server may analyze frequency bands pertaining to the frequencies and spectral flatness values of the five signals. A frequency band refers to a defined set of frequencies over the audible spectrum, where the frequency band has an identifier to that frequencies falling within the band can be grouped together during analysis. For context, the typical human may hear audible frequencies between 20 Hz to 20,000 Hz and adult humans may typically produce (during normal conversations) sounds with frequencies such as between 55 Hz to 250 Hz. It is understood that one of ordinary skill will recognize that some humans may produce frequencies above or below the example frequencies discussed. The network server may use the spectral flatness values to determine whether the sounds signal is being produced by a device, such as the television. The detailed discussion of spectral flatness values is provided herein, but put simply, the spectral flatness value is calculated and yields a ratio, typically between 0.0 and 1.0. The closer the ratio is to 1.0, the more likely the source of the sound signal is non-human. Thus, the network server may store spectral flatness values known to belong to humans, and these values may be between 0.0 and 0.1 and stored in non-transitory memory. The network server may establish a spectral flatness threshold (e.g., 0.5) such that spectral flatness values above the threshold likely indicate that the source of the sound signal is a coming from a device (or non-living being). In some instances, the network server may set the threshold high enough so that spectral flatness values for sound signals produced by animals are below the spectral flatness threshold.

Continuing with the example discussed above, the network server may determine that three of the sound signals have spectral flatness values below the spectral flatness threshold (i.e., the sounds from the dog, Bob, and Sally) and two of the sound signals have spectral flatness values above the threshold (i.e., the news anchor and interviewee on the television). The network server determines that four of the signals (i.e., Bob, Sally, the news anchor and the interviewee on the television) have frequency band identifiers which correspond to human speech for men and women. For example, each of these four signals may fluctuate somewhere between 55 Hz to 250 Hz.

However, the network server is configured to recognize that despite each of these four signals pertaining to frequencies corresponding to human speech, two of them have spectral flatness values above the threshold. As such, the network server may disregard the two sound signals in the audio clip file having spectral flatness values above the threshold, and only determine frequency band identifiers for sound signals that have spectral frequency values below the threshold. Recall that one sound signal was below also below the spectral frequency threshold (i.e., the dog's bark). The network server may determine that the sound frequencies of this signal fluctuate between 1000 Hz and 2000 Hz. The sound signal may also be sporadic and have no recorded sounds (due to the dog producing less or no sound between barks). The network server may determine that due to the frequency bands being higher than typical human speech and that the spectral flatness value is above typical spectral flatness values for human speech (despite being below the spectral flatness threshold), this sound signal likely pertains to an animal. By this, the features of the present disclosure can reduce the amount of processing cycles used in determining which sound signals within an audio clip file should be the basis for audio object delivery, thereby improving the processing efficiency by which the system operates.

Once each sound signal is distinguished, the network server may identify the frequency band identifiers sound signals pertaining to Bob, Sally, and in some instances, the barking dog. The network server may append the frequency band identifier(s) and spectral flatness value for each of the sound signals to the audio clip message. The network server may store the audio clip message for later use. In some embodiments, the network server may also perform speech recognition on the audio signals pertaining to the information appended to the audio clip message. Keywords, phrase, and/or phonemes may be determined from the sound signals and may be appended to the audio clip message with a reference as to which sound signal the recognized speech pertains. Using the appended information (and in some embodiments metadata of the audio clip message), the network server may assign the audio clip message to a voice matrix stored in a communicatively coupled database (e.g., a network data store). The voice matrix may contain audio signals and/or recordings known to belong to a specific source (e.g., Bob, Sally, and in some embodiments the dog). The network server may determine whether frequency band identifiers and spectral flatness values are shared between the signals of the audio clip message and a voice matrix. In some embodiments, the network server may also reference metadata of the audio clip message so as to narrow and decide which voice matrix pertains to the audio clip message. In some embodiments, if no match is found, the network server may create a new voice matrix and store information (e.g., the frequency band identifiers, spectral flatness values, and metadata) so that the network server can repeat the above analysis on another audio clip message and use the newly created voice matrix. In some embodiments, one voice matrix may be used for multiple users, and thus multiple user profiles may be associated with a single voice matrix.

Once the audio clip message is assigned to a voice matrix, the network server may identify a particular device that should be delivered an audio object, such as user equipment (like a smart phone) belonging to Bob. Recall that in the example above, Sally was the owner of the recording device that recorded their conversation and Bob was merely present in the environment. The network server may have assigned the audio clip message (having sound signal pertaining to Bob) to a voice matrix belonging to Bob. Based on the assigned voice matrix, the network server may identify user equipment which did not generate the audio clip message. Put simply, the network server may use Bob's voice matrix to identify his smart phone even though Sally's recording device generated the audio clip message which was analyzed by the network server. The network server may identify user equipment by determining which user profile belongs to the assigned voice matrix, and once determined, may determine the identification of user equipment from the user profile. The user profile may comprise information relevant to interests, habits, and/or other relevant characteristics that pertain to audio content delivered via an audio object. In some embodiments, the information appended to the audio clip message may have contained information determined using speech recognition (e.g., keywords, etc.), and thus information may be used in the selection of an audio object. An audio object comprises audio content and is executable by a device configured to playback audio and/or visual content, such as a smart phone, television, elevator, vehicle, or other device that is identified in the user's profile as being configured to handle execution of the audio object.

The network server may initiate delivery of an audio object to user equipment based on the voice matrix and/or user profile. In some embodiments, the network server may select the audio object and transmit it to the identified device (e.g., user equipment) via the network. In other instances, the network server initiates delivery of audio objects by requesting a content server to select and/or provide an audio object for delivery, which may be transmitted to the identified device from the content server and/or the network server. In some embodiments, the network server may initiate delivery of multiple audio objects to one or more particular devices. In terms of the example using Bob and Sally, recall that the audio clip file recorded Sally telling Bob that the dog was hungry, and she asked Bob to buy more of a certain brand of dog food. Because the network server had assigned the audio clip message to Bob's voice matrix and had identified Bob's smart phone, the network server may initiate delivery of an audio object that comprises audio content pertaining to the certain brand of dog food. In some embodiments, the network server may determine when Bob's smart phone is a defined distance from a retail establishment (which has known coordinates relative to access nodes on the network), and in response to being within the defined distance, the network server may initiate delivery of the audio object by obtaining an audio object corresponding to a sale of the brand of dog food, and send an audio object to one or more of Bob's user equipment (e.g., Bob's smart phone and/or vehicle). An application executing on Bob's device may receive the audio object, execute it via a processor, and play the audio object so that Bob is informed that the local establishment carries the brand of dog food. Thus, the present disclosure provides features that facilitate enhanced processor efficiency of network systems and provide a more robust manner of distinguishing relevant audio signals that can serve as the basis for delivery of audio objects.

The preceding paragraphs are not intended to be limiting, but are illustrative of example benefits of the system and methods described by this disclosure according to some embodiments. Examples of systems and methods will now be described in more detail according to some embodiments of the present disclosure.

FIG. 1A shows an example of a communication system 100 in accordance with various embodiments of the present disclosure. The example of system 100 comprises user equipment (UE) 102, recording device 103, access node 104, network 110, content server 112, audio clip data store 114, network data store 150, and network server 120, where each may communicatively couple to each other and/or the network 110 via wireless and/or wired communication technology. Any number of UEs 102 and/or recording devices 103 can be in wireless communication with any number of access nodes 104, and through their respective access nodes to network server 120. In the example shown in FIG. 1A, the network server 120 includes a processor 122 and memory 124. The memory 124 includes non-transitory memory that stores application 126 and is operable to store at least one audio file message 130. Devices within system 100 (e.g., UEs 102-102n, recording devices 103-103n, access nodes 104-104n, network server 120, content server 112, etc.) include a network communication device (e.g., radio transceiver(s)), memory (also referred to as a storage device), and a processor. Memory may be separate from the processor of each device, or may be integrated into the processor. The memory may be considered a storage device that includes volatile storage, non-volatile storage, or a combination of both volatile and non-volatile storage devices. Each storage device may be a single storage device or multiple storage devices. It is understood that embodiments of system 100 may comprise more than one of each device illustrated in FIG. 1A, such as the total number of UE 102, and/or recording device 103 may be in the thousands and/or millions, and a plurality of access nodes 104, servers (e.g., network server 120, content server 112), databases (e.g., audio clip datastore 114) may collectively be implemented to facilitate and/or provide communication links and communication service to the network 110 for a communication service provider.

The UE 102 may be configured in a variety of form factors, including but not limited to a mobile telecommunication device, such as a mobile phone (including smart phones), tablet computer, wearable computing device configured with network access and program execution capabilities (e.g., smart watch, smart glasses, helmet cam, etc.), digital media player, electronic book readers, notebook computer, gaming platforms (e.g., portable and/or non-portable gaming console), virtual reality headsets, vehicle infotainment system, set-top box, a personal computer having an integrated or external wireless network transceiver, home appliance (e.g., television, washer, dryer, oven, microwave) configured with network access and program execution capabilities (e.g., "smart TVs", "smart Appliances"), or some other non-generic devices that are configured for wired and/or wireless communication. Embodiments of system 100 may comprise plurality of user equipment, such as UE 102 through UE 102n.

The UE 102 and/or recording device 103 may communicate through an access node 104 to network 110. A communication service provider may provide and operate at least a portion of network 110 to which the various access nodes 104-104n communicate to other devices (e.g., any of network server 120, audio clip data store 114, content server 112, network datastore 150, etc.) and to each other. Each UE 102 and recording device 103 comprises memory and a processor, where the memory of each may be separate from their processor, or may be integrated into their processor.

The memory within the UE 102 and/or recording device 103 may be considered a storage device that includes volatile storage, non-volatile storage, or a combination of both volatile and non-volatile storage devices. Each storage device may be a single storage device or multiple storage devices.

Embodiments of system 100 may comprise a plurality of recording devices, such as recording device 103 through recording device 103n. A recording device 103 comprises user equipment (e.g., any of the form factors discussed above with respect to UE 102) that has a microphone (or other audio input components for accepting speech and/or audio input) and is configured so that the recording device 103 may be addressed through a user's spoken commands without first activating speech recognition non-verbally (e.g., by pressing a button). For example, recording devices (e.g., 103, 103n) may be configured to continuously "listen" for a particular word or phrase indicating that a user is addressing the recording device. In some embodiments, a recording device 103 may typically be stationary in location (e.g., due to being located on a kitchen counter-top in a user's home), may typically be transitory in location (e.g., due to being part of a vehicles infotainment system and thus moves as the vehicle is in transit), and/or may typically be a hybrid of stationary and transitory in location (e.g., a user's wearable device that may sometimes be worn and other times be sitting on a dresser but still active). In an embodiment, the recording device 103 may also be configured to record audio in response to a user's non-verbal action (e.g., pressing a button of the recording device). It is understood that embodiments of devices of system 100 within the present disclosure (e.g., UE 102, recording device 103, access point 104, network server 120, content server 112, and network data store 150, etc.) are non-generic, particular machines that are configured to operate and function in accordance with the features disclosed herein.

In embodiments of the present disclosure, the recording device 103 may be triggered to activate and generate an audio file message 130 in response to a particular word or phrase indicating that the user is addressing the recording device 103. For example, the user may have programmed the recording device 103 with a nickname "Sam", and when the user says "Hey Sam" (i.e., the recording device's trigger phrase), the recording device detects that trigger phrase and generates audio file message 130 comprising an audio clip file 132. Because the recording device 103 may be continuously listening, the recording device may be configured by an application to include a recording of audio signals within audio clip file 132 from a defined time (e.g., two seconds) before the user says the trigger phrase. Similarly, the recording device 103 may continue recording audio signals for the defined time period (e.g., two seconds) after the user stops speaking to the recording device 103. By this, the recording device 103 captures audio in the audio clip file 132 from before and after the user speaks. In an embodiment, the recording device 103 may not rely on a trigger phrase (and/or word) to initiate generation of the audio clip, but rather may continuously listen and record one or more audio signals as they are detected for inclusion in one or more audio clip files sent over the network 110 via one or more audio clip messages. In this embodiment (where a trigger phrase and/or word may not be required), the network server 120 may provide determinations as to which audio clip files to use, further discussed herein. Irrespective of reliance on a trigger phrase and/or word to initiate recording of sounds, the recording device 103 and UE 102 may each comprise an application programming interface (API) that allows for transmission of audio clip messages to an audio clip data store 114. Each audio clip file may be sent in its own audio clip message and/or multiple audio clip files may be sent in one or more audio clip messages.

In some embodiments, the user may not be the only source of audio during the time that the recording device 103 is recording the audio clip file 132. For example, a husband may direct a question or command to recording device 103 (via use of the trigger phrase and/or word) while the husband's partner is asking the husband a question or carrying on a separate conversation in the background. Other examples may include background noises of children talking, pets making sounds (barking), televisions producing noise from a news anchor. Thus, the user's voice and background voices and/or other noises (e.g., sounds not produced by humans in the environment, but rather animals, appliances, traffic, etc.) are recorded as audio signals in the audio clip file 132. In some embodiments, the recording device 103 records audio signals into an audio clip file 132 based on recording audio from a phone call (e.g., mobile phone call and/or landline phone call). In some embodiments, the recording device 103 may be configured to intercept audio files being sent via the network 110 in an email, text message (e.g., using a short message service), video message, and/or voicemail. Once intercepted, extract audio files that it (i.e., the recording device 103) was not responsible for recording, and include the audio clip file along in an audio clip message. It is understood that the audio signals are not transitory because they have been recorded to the audio clip file 132. Each audio signal within the audio clip file 132 corresponds with audio frequencies measured in hertz (Hz) and the audio signal has an intensity (i.e., loudness and/or strength) measured in decibels (dB). The recording device 103 (including user equipment configured to be a recording device) may be configured to transmit audio clip messages (e.g., audio file message 130) over the network 110 via an access node 104 to an audio clip data store 114 for storage in its non-transitory memory.

The audio clip data store 114 comprises hardware (e.g., processor and memory) and an application programming interface (API) that enables at least the network server 120 to access and retrieve a plurality of audio clip messages (e.g., audio file message 130). In an embodiment, the audio clip data store 114 is at least partially comprised within network server 120. A plurality of audio clip messages may be stored in memory of the audio clip data store 114. When each audio clip message (e.g., 130) initially arrives in the audio clip data store 114, it comprises an audio clip file (e.g., 132) and metadata (e.g., 134). The recording device 103 is responsible for including at least some of the metadata 134 within the audio file message 130. In an embodiment, another device (e.g., an access node 104, devices within network 110, and/or network server 120) may include information within the metadata before it reaches audio clip data store 114 for storage in memory.

Examples of metadata 134 include, but are not limited to, a user identifier (e.g., a string of characters assigned to a particular user login of the recording device 103 upon activation with a service provider), a unique identifier (e.g., a mobile equipment identifier, internet protocol address, media access control address, international mobile equipment identity, and/or manufacturer serial number), a uniform resource locator (URL) address, time stamp, date stamp, recording device indicator (e.g., a value indicating what type of device recorded the audio clip file, such as a mobile phone, dedicated recording device in a user's home/office, wearable device, appliance, etc.), user profile identifier (e.g., a service provider profile number assigned to the device), location information (e.g., global positioning system coordinates, zip code, cell sector location within the network for the access node, etc.), or any combination thereof. In some embodiments, the audio clip data store 114 may organize a plurality of audio clip messages (e.g., 130) according to information within the metadata of each message. This may allow the network server 120 to target, retrieve, and ingest audio clip messages from specific recording devices 103.

Access nodes 104 through 104n may be configured to provide a wired and/or wireless communication link to devices (e.g., UE 102 and/or recording device 103) in accordance with at least one wired and/or wireless communication standard and/or protocol. Examples of wireless standards and/or protocols include standards under the 3rd Generation Partnership Project (3GPP) and/or protocols such as Long Term Evolution (LTE), Worldwide Interoperability for Microwave Access (WiMAX), High Speed Packet Access (HSPA), Code Division Multiple Access (CDMA), Global System for Mobile Communication (GSM), Bluetooth®, wireless fidelity (Wi-Fi), or any combination thereof. Access nodes may include routers, cell sites, or other devices that are configured to facilitate user equipment's access to network 110. An access node 104 may, in some embodiments, be referred to according to the communication technology which it supports, such as being referred to an enhanced Node B (eNB) for corresponding to an LTE technology, or a base transceiver station (BTS) for corresponding to a GSM technology. At least access node 104 may be implemented within system 100 to facilitate and/or provide wired and/or wireless communication links to one or more UE 102 and/or recording device 103, and communicatively couple one or more of them to the network 110.

Network 110 may include a plurality of switches, routers, servers, software, and/or other elements that are configured to provide connectivity for a device (e.g., UE 102, recording device 103, etc.) to servers (e.g., network server 120, content server 112), data stores (e.g., 114, 150), the world wide web, and various services offered by service provider(s) associated with at least a portion of network 110. The network 110 may include a communications network (e.g., a cellular telecommunications network) and/or the internet. Embodiments of network 110 may comprise a public network, private network, wired network, wireless network, virtual network, telephone network, or any combination thereof and may comply with the wireless standards discussed above.

The network data store 150 may comprise hardware (e.g., processor and memory) and an application programming interface (API) that enables at least the network server 120 to access its memory. In an embodiment, the network data store 150 is at least partially comprised within network server 120. The network data store 150 may be remotely-located from other devices within the system (e.g., network server 120), and may be distributed across a plurality of data storage devices (e.g., cloud storage). The network data store 150 has memory that may comprise a plurality of voice matrices (e.g., one or more voice matrix 152). Each voice matrix 152 includes a data structure that is readable by network server 120. The voice matrix 152 may be configured to identify a user by being the known voice signature (i.e., known sound frequencies, cadence, vocabulary usage, and/or other determined characteristics that are associated with a user), where the user is associated with a user profile 154 stored in memory and accessible to network server 120. Put simply, a voice matrix 152 may include a collection of voice samples known to be from a particular user. Each voice matrix 152 corresponds with one or more frequency band identifiers and/or spectral flatness values that the network server 120 can use to compare and determine matches.

In an embodiment, the network server 120 may update voice matrices 152 with additional audio clip files that pertain to a user that is communicating into and/or near a UE 102 and/or recording device 103. For example, when a user updates their voicemail recording, the network server 120 may extract an audio clip file from the voicemail recording and add the audio clip file (along with its frequency band identifier and/or spectral flatness value) to the voice matrix 152. In an embodiment where the user does not already have a voice matrix 152 stored in the system (and/or the network server 120 does not identify the audio clip file as being associated with an existing voice matrix 152), then a new voice matrix may be created for the user based on an audio clip file 132 (recorded from a recording device 103) and/or based on extraction from another source (e.g., a recorded voicemail message and/or phone call of a user's UE 102 via network 110).

The network data store 150 may also store a user profile(s) (e.g., one or more user profile 154) that is associated with a user and any UE 102 and/or recording device corresponding to the user. Each user profile 154 includes a data structure that is configured to be stored in memory and readable by network server 120. Each user profile 154 may comprise user information and information that is also included with metadata 134 found in audio clip messages 130. For example, a user profile 154 may include one or more user identifiers, a unique identifier pertaining to devices associated with the user (e.g., unique identifiers for one or more UE 102 and/or recording device 103, which may also be contained within metadata 134), a recording device indicator pertaining to what devices have recorded the user's voice, a user profile identifier (e.g., a service provider profile number assigned to one or more devices of the user), a location information known to be associated with the user's activities, or any combination thereof.

In some embodiments, each user profile 154 may also include keywords and/or phrases (stored within the data structure) that enable a network server 120 and/or content server 112 to identity what audio objects 156 are relevant to the user. Audio objects 156 will be described in greater detail below. The keywords and/or phrases may be extracted from audio clip files (e.g., embedded within audio clip messages 130 and/or messages traversing network 110 due to voice mail and/or phone calls). In some embodiments, the keywords and/or phrases may be determined by application 126 using speech recognition of the audio clip files 132 so that the key words can be generated based on the audio clip file 132 and stored in a user profile 154 and/or voice matrix 152.

Audio object(s) 156 includes a data file that renders on a device to present audio content, audiovisual content, or some other audible content capable of being produced by a speaker of the device. In some embodiments, audio objects 156 may be unsolicited content (i.e., audible content that the user did not specifically request to be presented on a speaker coupled to a device), which may colloquially be referred to as an electronic advertisement. The network server 120 may communicate with a device (e.g., any of UE 102-102n) that is configured to present audio object(s) 156 via a speaker integrated into the device, a speaker communicatively coupled to the device, and/or a group of speakers. For example, the UE 102 may take the form of a television and an audio object 156 may be played back via the television. Another example may include a second UE (e.g., UE 102n) being wirelessly coupled to a remotely located speaker via Bluetooth®, such that while the user is using streaming music and/or radio, the audio object 156 is transmitted to the second UE and played via its remotely located speaker as an electronic advertisement between songs. Yet another example may include an audio object 156 being sent to a device (having a communicatively coupled speaker) disposed within an elevator and/or fuel dispenser system at a gas station such that the audio object 156 is played when the user enters the elevator and/or fills up their car at the gas station.

Each audio object 156 may include embedded tags with words (occasionally referred to as keywords), phonemes, and/or phrases that may be used by a network server 120 and/or content server 112 to use when matching and selecting audio objects 156 for a particular user profile 154. When keywords, phonemes, and/or phrases in the user profile 154 and the audio object's 156 embedded tag(s) matches (and/or is when the words are determined to be associated with each other), then the matching audio object 156 may be pulled (and/or queued) for transmission to a designated playback device (e.g., any of UE 102-102n and/or recording device 103-103n). In some embodiments, the network server 120 may have access to audio objects 156 stored in memory of network datastore 150, and thus request, pull, and/or obtain audio object(s) 156 based on their association with a user profile 154. In an embodiment, a content server 112 may control retrieval of audio objects 156, and thus when the network server 120 determines the user profile 154, the network server 120 may transmit a request to the content server 112 for an audio object 156 based on the user profile 154. In reply, the content server 112 may feed the audio object 156 back to the network server 120 for distribution. In some embodiments, the network server 120 may give the content server 112 an address of the device (e.g., UE 102-102n and/or recording device 103-103n) that is to be the target of the audio object 156, and allows the content server 112 to push the audio object 156 to the target via the network 110.

Figure 1B:
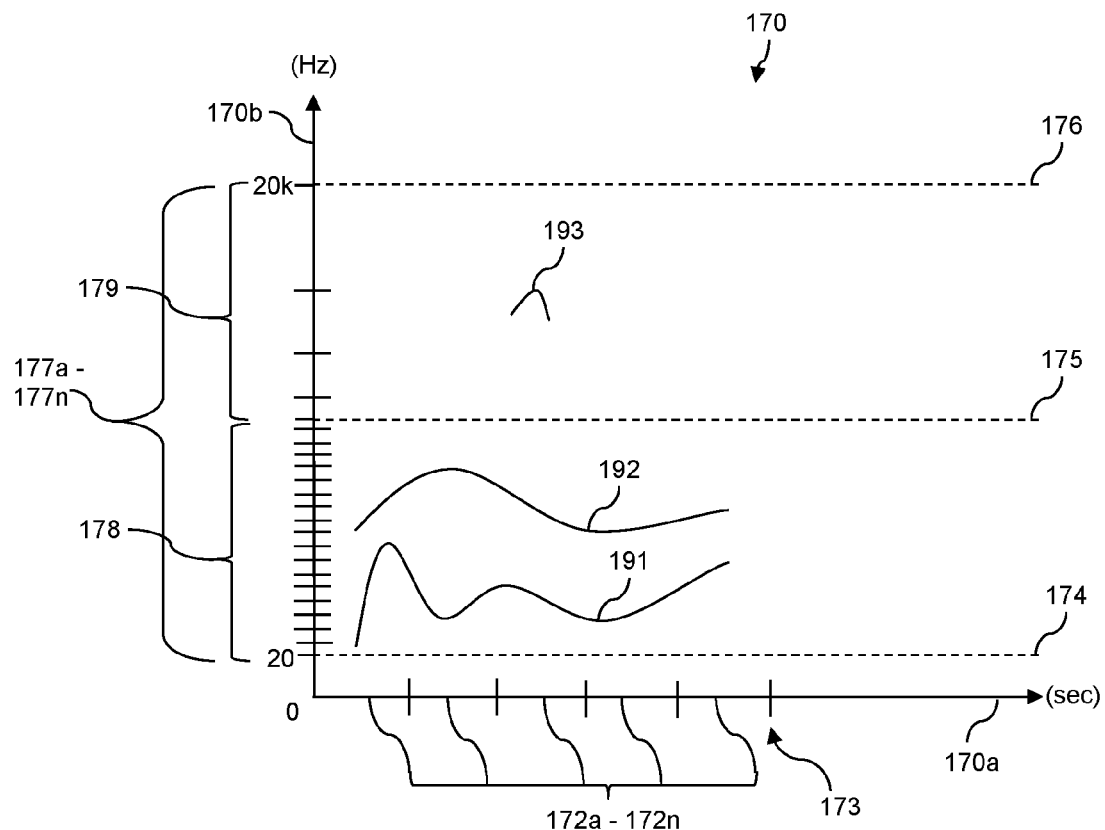
FIG. 1B illustrates a visual representation of elements within an audible frequency analysis performed by embodiments of the communication system of FIG. 1A.

Still referring to FIG. 1A with reference to FIG. 1B, the system 100 comprises network server 120. The network server 120 may be associated with a service provider and may be distributed across a plurality of computer systems. The network server 120 comprises a processor 122 and memory 124 that stores application 126 which configures at least the network server 120. The network server 120 is communicatively coupled to a transceiver that provides communication links to the network 110 and/or other devices within the system via direct and/or indirect communication links (e.g., any of UE 102, recording device 103, access node 104, content server 112, network data store 150, audio clip data store 114, etc.). The network server 120 may be configured to provide audible content via executable audio objects 156 for presentation using a speaker of a device (e.g., UE 102-102n). The network server 120 may be configured by application 126 to provide delivery of audio objects 156 based on audible frequency analysis. The network server 120 may be configured by application 126 to perform analysis of sound frequencies that are within an audible spectrum, referred to as audible frequencies. In some embodiments, a range of audible frequencies may be from at least 20 hertz (Hz) to 20,000 Hz (i.e., 20 kilohertz (kHz)).

In embodiments of system 100, the application 126 may configure the network server 120 to request an audio file message 130 from audio clip data store 114. In response, at least the audio file message 130 is received by the application 126. In some embodiments, the application 126 may request a plurality of audio clip messages from audio clip data store 114. The request for audio clip messages may indicate particular recording device(s) (e.g., any of recording devices 103-103n) that generated audio clip files. The application 126 may ingest a plurality of audio clip messages 130, where each audio file message 130 comprises an audio clip file 132 and metadata 134. Ingesting the plurality of audio clip messages 130 may include the application 126 receiving the audio clip messages (e.g., from audio clip data store 114), creating a queue in which each of the received audio clip messages are placed, and selecting at least one audio clip message for analysis.

In some embodiments, audible frequency analysis is performed by the application 126 executing on network server 120 for each of the plurality of audio clip messages. For at least one audio clip message (e.g., audio file message 130), the network server 120 is configured by the application 126 to provide audible frequency analysis. For example, in some embodiments the application 126 may select the audio file message 130 and determine whether the audio clip file 132 exceeds a predefined time length. The audio clip file 132 may have recorded sounds (i.e., frequencies) and the total time of the recording may exceed a predefined time length for efficient analysis. Examples of the predefined time length include, but are not limited to 10 seconds, 30 seconds, 60 seconds, or another predefined time. If the audio clip file 132 exceeds the predefined time length, the application 126 may reduce the audio clip file 132 to the predefined time length. Reduction of the audio clip 132 includes at least providing a start time and end time spanning the predefined time length 173. Thus, the application 126 may analyze the frequencies of signals between the start time and end time. In some embodiments, reduction of the audio clip file 132 also includes splicing the audio clip file 132 into multiple files, with each file no greater than the predefined time. In an embodiment, the application 126 converts the audio clip file 132 into another file format and stores the converted audio clip file 132 in a standardized naming form. Examples of file formats include, but are not limited to: Waveform Audio File (WAV) format, Free Lossless Audio Codec (FLAC) format, MP3 format, or any other compressed and/or uncompressed audio formats.

For clarity, the following discussion will make occasional reference to FIG. 1B, which illustrates a visual representation 170 of the audible frequency analysis performed via execution of application 126. The network server 120 is configured by the application 126 to create a plurality of time bins that collectively span the predefined time length of the audio clip file. A time bin includes a segmented portion of audio signal (e.g., audio signals 191-193) within the audio clip file 132 so that frequencies of each signal within the time bin can be analyzed by application 126. For example, FIG. 1B shows visual representation 170 with an x-axis 170a indicating time (in seconds) and y-axis 170b indicting frequency (in Hz). The plurality of time bins 172a-172n are shown as five time bins, however it is understood that another number of time bins may be created by the application 126. In some embodiments, each time bin is approximately the same amount of time. For example, the predefined time length 173 may be ten seconds long, and each time bin may be two seconds in length, thus yielding five time bins with each time bin being two seconds in length. The application 126 may have a time bin length definition store in memory 124 so that irrespective of the predefined time length 173, each time bin will conform (i.e., be no greater than) to the time bin length definition. The time bin length definition will dictate how many time bins 172a-172n are created based on the predefined time length 173. For example, if the predefined time length 173 were twenty seconds instead of ten seconds, and the time bin length definition is for two seconds, then the application 126 may create ten time bins 172a-172n, each two seconds in length. Each time bin may be assigned a time identifier, such as a value stored in memory 124. Thus, if the predefined time length is ten seconds and the time bin length definition is two seconds, five time bins would be created with corresponding time identifiers of "1" through "5", respectively.

The audio clip file 132 includes one or more signals having audio frequencies that are sounds recorded by a recording device (e.g., recording devices 103-103n). For example, FIG. 1B illustrates three audio signals 191, 192, and 193 which correspond with recorded sounds in an audio clip file (e.g., 132). Each of the audio signals 191-193 fall within one or more time bins, such as signals 191 and 192 spanning five time bins and signal 193 being located within one time bin. The application 126 analyzes audio signals of the audio clip file 132 that have recorded sounds frequencies audible for the average human, such as recorded frequencies that are no greater than an upper frequency boundary 176 (e.g., 20 kHz). The application 126 may create a trigger sound frequency 174 to correspond with the lowest frequency that should be analyzed within the audio clip file 132, and thus signals with frequencies below the trigger sound frequency 174 will not be analyzed because they are typically less than frequencies that are audible to an average human (i.e., below 20 Hz). For frequencies above the trigger sound frequency 174, the application 126 may determine which time bin the frequencies for each signal 191-193 fall within. The range of audible frequencies for a human (e.g., 20 Hz-20 KHz) may be segmented into multiple bands of frequencies, referred to as frequency bands 177a-177n. A frequency band refers to a defined range of frequencies (e.g., 20 Hz-40 Hz, 80 Hz-85 Hz, 3 kHz-5 kHz), which may be measured in Hz and/or kHz and stored as a definition in memory by application 126. The application 126 may assign frequencies (from each signal 191-193) within each time bin (172a-172n) of the audio clip file 132 to one or more frequency bands (one of frequency bands 177a-177n), where each frequency band has its own frequency band identifier. For example, in an embodiment, one or more frequency bands may exist for frequencies between 20 Hz to 2 kHz, 2 kHz to 4 kHz, 4 kHz to 6 kHz, and continue in various increments (e.g., 2 kHz) until hitting an upper frequency boundary (e.g., at least a frequency band for 18 kHz to 20 kHz before hitting upper frequency boundary of 20 kHz).

In some embodiments, at least some of the frequency bands 177a-177n may be non-uniform in range (i.e., each frequency band may not pertain to the same amount of frequencies contain therein), such as some frequency bands spanning 10 Hz while others span 30 Hz or more. In some embodiments, the application 126 may create more frequency bands for frequencies that lay within the typical spectrum of human speech than for frequencies that human do not typically make (i.e., produce using their voice). For example, frequency bands 178 The application 126 may determine that the highest frequency typically assigned to human sound production may correspond with a vocal frequency threshold measured in Hz (e.g., a female scream producing frequencies of 3 kHz). Thus, the network server may not associate frequencies above the vocal frequency threshold 175 with sounds produced by humans. Thus, the application 126 may create more frequency bands between the trigger sound frequency 174 and the vocal frequency threshold 175 (e.g., between 20 Hz and 3 kHz) than the number of frequency bands that are located between the vocal frequency threshold 175 and the upper frequency boundary 176 (e.g., between 3 kHz and 20 kHz). For example, the application 126 may create four frequency bands for frequencies above those typically made by humans (i.e., for frequencies above the vocal frequency threshold 175, such as above 3 kHz). Each of these four frequency bands above the vocal frequency threshold 175 may span a greater number of frequencies than frequency bands below the vocal frequency threshold 175. Comparatively, the frequency bands below the vocal frequency threshold 175 may span a narrower band of frequencies. Put simply, the frequency bands 179 between the vocal frequency threshold 175 and the upper frequency boundary 176 may span more frequencies (e.g., thousands of hertz), whereas frequency bands 178 correspond to sounds capable of being made by humans (e.g., between 174 Hz and 175) that each span less frequencies thereby giving finer granularity, such as spanning tens or hundreds of hertz. For example, the frequency bands 179 above the vocal frequency threshold 175 may each span frequencies equal to or greater than 2 kHz (e.g., a separate frequency band for each of: 3 kHz-5 kHz; 5 kHz-10 kHz; 10 kHz-15 kHz; and 15 kHz-20 kHz), whereas frequency bands 178 below the vocal frequency threshold 175 may be uniform and/or non-uniform and span more narrow ranges (e.g., frequencies greater than 20 Hz and less than 3 kHz, a separate frequency band exists in 10 Hz, 20 Hz, and/or 100 Hz, increments) than frequency bands 179 above the vocal frequency threshold 175.

For example, the average man's speaking voice may produce frequencies between 65 Hz and 155 Hz. A woman's speech produces frequencies typically between about 100 Hz to 255 Hz, and a child's speech typically produces frequencies from 180 Hz to 400 Hz and higher. Thus, the application 126 may create a plurality of frequency bands between the trigger sound frequency 174 (e.g., 20 Hz) and the vocal frequency threshold 175 (e.g., 3 kHz), where the amount of frequency bands below the vocal frequency threshold 175 are greater in number than above the vocal frequency threshold 175 (i.e., more frequency bands 178 exist than frequency bands 179). Frequency bands above the trigger sound frequency 174 may span a more narrow range (e.g., 10 Hz, 20 Hz, etc.) of frequencies up until the vocal frequency threshold 175 (e.g., 3 kHz). This allows the application 126 to determine whether frequencies within the frequency bands 178 correlate with a child, adult, male, and/or female, and once the relevant frequency bands are identified, they may be compared with those of subsequent audio clip files and/or with frequency band identifiers contained in voice matrices 152 to determine and/or confirm that an association or match exists, thereby indicating an identity of the person whose voice was recorded in the audio clip file 132.

To determine which recorded sounds have a high enough frequency to merit analysis, the application 126 may identify frequencies that are at or above the trigger sound frequency, and determine the corresponding time bins for these frequencies. For example, to determine which time bins correspond with recorded sound frequencies, the application 126 may look at which time bins in the audio clip file 132 have frequencies above the trigger sound frequency and which time bins are relatively silent (i.e., below the trigger sound frequency), where the trigger sound frequency is a defined value in memory (e.g., for 20 Hz, 15 Hz, or another defined value in memory). In some embodiments, time bins with recorded frequencies below the trigger sound frequency may be identified, but audible analysis (e.g., for speaker identification and/or speech recognition) may not be conducted by the network server 120 for the frequencies below the trigger sound frequency. Instead, the application 126 may analyze only frequencies that are at or above the trigger sound frequency. The application 126 determines that a time bin corresponds with the trigger sound frequency when the time bin has frequencies that are at or above the trigger sound frequency. The application 126 may determine which time bins correspond with a trigger sound frequency by first determining a time bin in which the frequencies above the trigger sound frequency first start (which may be referred to as a first time bin) in the audio clip file. The application 126 may then determine which is the last time bin in the audio clip file 132 that has frequencies above the trigger sound frequency 174 (and may refer to this last time bin as a second time bin). It is understood that in some embodiments, there may exist time bins after the last time bin in which frequencies are recorded above the trigger sound frequency. The application 126 determines the time bin identifier for each time bin that has frequencies above the trigger sound frequency 174 and may determine the frequency band(s) for frequencies within these time bins. When a recorded sound (i.e., recorded audio signal) has frequencies that are above the trigger sound frequency 174, the application 126 may determine each frequency band identifier corresponding to the frequency bands which span the recorded frequencies in the audio clip file 132.

For example, the application 126 may configure network server 120 to determine that three out of five time bins correspond with the trigger sound frequency 174 due to three of the time bins having signals with sound frequencies at or above the trigger sound frequency 174 (e.g., each of signals 191-193). For instance, the predefined time length may be ten seconds and the network server creates five time bins with each being two seconds in length. Each of the five time bins is assigned a time bin identifier, such as "1" through "5". The network server 120 may determine that three of the time bins correspond with the trigger sound frequency because time bins with identifiers "2", "3", and "4" each have frequencies at or above the trigger sound frequency (e.g., 20 Hz).

In some embodiments, the time bin that is the first one with sound frequencies at or above the trigger sound frequency 174 may be referred to as a starting time bin, and the time bin that is the last one with sound frequencies at or above the trigger sound frequency 175 may be referred to as an ending time bin. For instance, from the above example, the network server 120 may determine that time bin with identifier "1" does not have frequencies contained therein or has frequencies, but they are below the trigger sound frequency. This may also be the case for the time bin with time bin identifier "5" in the above example. Once the application 126 determines which time bins have frequencies at or above the trigger level, the application 126 may configure the network server 120 to determine which frequencies bands these sound frequencies pertain to, and store the frequency band identifier for each of these frequency bands. For instance, using the example above, if time bins with identifiers "2", "3", and "4" have frequencies ranging from 80 Hz to 130 Hz that span multiple frequency bands, then the network server 120 determines the frequency band identifiers for each of the frequency bands that cover the 80 Hz to 130 Hz range.

To distinguish when a person is speaking in the environment of the recording device 103 versus a sound produced by a device or animal (e.g., distinguishing between a husband and wife having a conversation versus a news anchor speaking on a television in the background or a washing machine running), the application 126 may continue audible frequency analysis by determining the spectral flatness value of sounds recorded in the audio clip file 132, specifically for the audio signals having frequencies in time bins along the predefined time length and above the trigger sound frequency 174.

Figure 1C:
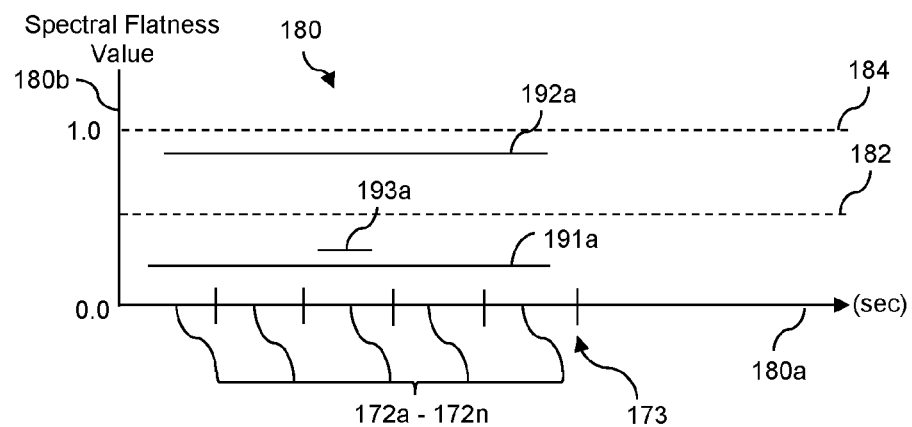
FIG. 1C illustrates another visual representation of spectral flatness elements used in audible frequency analysis performed by embodiments of the communication system of FIG. 1A.

FIG. 1C illustrates a visual representation 180 of spectral flatness elements used in audible frequency analysis performed by embodiments of the communication system 100 of FIG. 1A. The visual representation 180 has an x-axis 180a corresponding to time (in seconds) and a y-axis 180b corresponding to spectral flatness values, which in numerical units as discussed below. In some embodiments, the application 126 may determine spectral flatness only for time bins that have frequencies above the trigger sound frequency 174 discussed in FIG. 1B. In general, spectral flatness refers to a measure of the width, uniformity, and noisiness of the power spectrum for the recorded sounds (e.g., recorded signals 191-193 each having their own spectral flatness values 191a-193a). A "high" spectral flatness (i.e., closer to the spectral flatness boundary 184) indicates that the audio signal's spectrum (i.e., its frequency domain representation) has a similar amount of power in all spectral bands, and the graph of the spectrum would appear relatively flat and smooth; this would sound similar to white noise. A low spectral flatness indicates that the spectral power is less uniform in frequency structure, and this may be indicative of human speech. Therefore, the analysis over multiple time bins for determining the spectral flatness of the signal may be beneficial for the network server 120 in distinguishing speech of humans in the environment versus noises not coming from humans (e.g., from a television or yard equipment).

Specifically, the application 126 may determine spectral flatness by generation of a spectral flatness value. In some embodiments, the generation of the spectral flatness value may be based at least on the frequencies above the trigger sound frequency 174 within the time bins, such as at least one time bin between a first time bin and second time bin that correspond with the beginning and ending of a conversation. As seen in FIG. 1C, the application 126 determines the spectral flatness values 191a-193a for signals within each time bin 172a-172n along the predefined time length 173. The application 126 may use the spectral flatness value (191a-193a) of each signal (191-193, respectively) as a measure to characterize audio frequencies within the time bins, specifically how close the sound is to being pure noise with a high spectral flatness (and thus indicating that the signal was not produced by a human). A spectral flatness value may be stored as a value in memory 124 and is defined by a ratio of the geometric mean of a power spectrum to the arithmetic mean of a power spectrum (i.e., dividing the geometric mean of the power spectrum by the arithmetic mean of the power spectrum, thereby yielding the ratio).

One of ordinary skill in the art recognizes that the arithmetic mean of a sequence of n items is determined by the mean or average of the items in the sequence, such as by using the audio signal in the time bins as recorded in the audio clip file 132. One of ordinary skill in the art recognizes that the geometric mean of a sequence of n items is the nth root of their product. The application 126 determines the geometric mean by taking the arithmetic mean of the logarithms of the items, then taking the exponential of the result. The items of each sequence refers to values calculated by the application 126 based on using the power spectrum of the audio signal recorded in the time bins, where the power spectrum is determined by squaring the absolute value of the Fast Fourier Transform of the signal.

The application 126 may generate spectral flatness values ranging between 0.0 and 1.0, where the 1.0 marks the spectral flatness boundary 184. It is understood that a high spectral flatness value approaches and/or achieves 1.0 (e.g., 1.0 for white noise) and a low spectral flatness value approaches 0.0 (e.g., 0.0 for a pure tone), such as illustrated in FIG. 1C. A spectral flatness value that produces a ratio of 1.0 refers to an ideally flat power spectrum (i.e. constant) because its arithmetic mean and geometric mean would be equal, thereby yielding a ratio of 1.0. On a range from 0.0 to 1.0, the application 126 will not generate a spectral flatness value more than 1.0 because the geometric mean will always be less than or equal to the arithmetic mean, thereby demonstrating that a ratio of 1.0 will happen only for constant sequences of sounds produced by a machine. In an embodiment, the application 126 may generate a spectral flatness value on a logarithmic scale, so instead of ranging from 0.0 to 1.0, the spectral flatness value would range from negative infinity to 0.0 (in this embodiment 0.0 would be the upper spectral flatness boundary 184), where more negative values have lower spectral flatness and negative values closer to 0.0 have a higher spectral flatness. It is understood that spectral flatness values may be a stored as decimal number in non-transitory memory and it have numbers extending multiple digits to the right of the decimal point. In some embodiments, the application 126 may distinguish between male and female speech (i.e., whether recorded sounds were made by a human male or female) by analyzing the values in the tenths, hundredths, thousandths, ten thousandths, and/or hundred thousands place.

The noises generated by machines or equipment produce a higher spectral flatness value than humans speaking in a room. For example, if two people have a conversation in a room comprising recording device 103 that records their conversation in audio clip file 132, their recorded conversation may be determined by network server 120 to have a spectral flatness value (such as between 0.0 and 0.10). In contrast, if the recording device 103 recorded a television in the background showing a news anchor talking to a host and the television presenting sounds of their conversation through speakers and included the sounds in audio clip file 132, the network server 120 may determine that these sounds have a higher spectral flatness than speech produced by humans, and generate another spectral flatness value that is higher than the first (e.g., above 0.5 but less than 1.0) because these sounds were produced by background equipment (here a television) instead of humans present in the environment. When an audio clip file 132 has signals with recorded sounds produced by both humans, non-humans (e.g., animals), and/or equipment or other non-human devices making sound (e.g., television, appliance, lawnmower, etc.), the application 126 assigns the generated spectral flatness values 191a-193a to the signals 191-193, where the signals 191-193 have frequencies identified as corresponding to the humans and equipment, respectively.

To distinguish sounds generated by humans sounds generated by machines or equipment, the application 126 compares spectral flatness values 191a-193a to a spectral flatness threshold 182. Thus, the application 126 determines whether or not a generated spectral flatness value exceeds a spectral flatness threshold 182. Spectral flatness values above the spectral flatness threshold 182 correspond with sounds that are not produced by a human's voice (e.g., by human's speaking, singing, screaming in the environment). For instance, even though a television produces a signal 192 with frequencies falling within frequency bands 178 (i.e., frequency bands associated with human sounds), the signal 192 has a spectral flatness value 192a above the spectral flatness threshold 182, thereby confirming that the signal 192 was produced by a machine or equipment (here the television). In contrast, signal 193 may be determined by application 126 to have spectral flatness value 193a below the spectral flatness threshold 182. In some embodiments, the application 126 may proceed with identification of a speaker in the recorded audio clip file 132 for frequencies and/or time bins that have spectral flatness values below the spectral flatness threshold 182 (because spectral flatness values below the threshold 182 indicates that the sounds are produced by humans). Thus, in an embodiment, the application may determine frequency band identifiers in response to the generated spectral flatness values 191a-193a being below the spectral flatness threshold 182 (e.g., which may be predefined in memory such as a value of 0.5, 0.4, or another defined spectral flatness value). Thus, the application 126 performs audible frequency analysis at least by determination of whether the signals have spectral flatness values below the spectral flatness threshold 182, and if so, whether the spectral flatness values and/or frequency bands of the signal corresponds with frequency bands that indicate human speech (e.g., frequency bands 178). In some embodiments, even though a signal's spectral flatness value is above the spectral flatness threshold 182, the application 126 may determine that the frequency bands are relevant to the human in the environment based on detecting a pattern over time, such as the sound being a television that is playing a certain television show every weeknight that the person in the environment watches. Thus, in an embodiment, the application 126 might not disregard signals having frequencies above the spectral frequency threshold 182, but instead treat these signals as if they had spectral frequency values below the spectral frequency threshold 182.

In some embodiments, the network server 120 may identify words, phrases, and/or phonemes from audio signals of the audio clip file 132 so as to perform speech recognition. In some embodiments, the network server 120 performs speech recognition only for signals having spectral flatness values below the spectral flatness threshold 182. For example, the network server 120 may perform speech recognition, such as but not limited to, by extracting an audio clip file 132 from an audio file message 130 that is stored in its memory 124 and/or the audio clip data store 114 and then determining whether the audio signals 191-193 have spectral flatness values 191a-193a, respectively, below the spectral flatness threshold 182. The application 126 may implement any number of different speech recognition algorithms, including acoustic modeling, language modeling, and hidden Markov models. Hidden Markov models are statistical models that, upon implementation by the application 126 and execution on processor 122, may output a sequence of symbols or quantities. The audio signal (that the network server 120 identifies as belonging to a voice matrix 152 stored in the network data store 150) comprises speech that the application 126 treats as a piecewise stationary signal or a short-time stationary signal. In short time scales, the speech can be approximated as a stationary process.

The application 126 may implement multiple hidden Markov models that can be trained automatically, and can output a sequence of n-dimensional real-valued vectors (with n being a small integer, such as 5, 10, or integers less than 100), where the sequence is output repeatedly at defined intervals (e.g., every 10 milliseconds). The vectors may comprise cepstral coefficients, which are obtained by the application 126 taking a Fourier transform of a defined time window of speech (i.e., frequencies within time bins of the audio clip file 132) and the application 126 decorrelating the power spectrum using a cosine transform, then the application 126 taking the first, most significant coefficients (i.e., at least one coefficient that is larger than all others). Each hidden Markov model used by the application 126 may have a statistical distribution that is a mixture of diagonal covariance Gaussians, and thus may give a likelihood value for each observed vector. Each word and/or phoneme may have a different output distribution through which the likelihood value may be compared by the application 126 and yield a determination of a word and/or phoneme. A hidden Markov model for a sequence of words or phonemes (i.e., a phrase) may be generated by the network server 120 concatenating the individual trained hidden Markov models of the application 126 for the separate words and phonemes, thereby allowing the application 126 to generate multiple likelihood values, which can be compared with known values of words and/or phonemes in a sequence (i.e., values in a sequence corresponding to the phrase) and identify the phrase to which the recorded voice is referring. In some embodiments, the network data store 150 may comprise predefined sounds known to be associated with non-human sounds from the recorded environment, such as from machines, devices, or equipment inside or outside a user's home. For example, the network server 120 may be able to access the intensity (in dB), frequency, and/or spectral flatness value of the predefined sound corresponding with background noises such as, but not limited to, one or more of: a toilet, washing machine, air conditioning unit, ceiling fan, ventilation fan, refrigerator, vehicle engine as measured from inside the vehicle's cabin, exhaust fans, hair dryer, dog barking, or any combination thereof.

The application 126 may append the generated spectral flatness value(s), the frequency band identifier(s), and/or time bin identifier(s) to audio file message 130. In some embodiments, the network server 120 may use speech recognition to recognize audio and generate keywords, phonemes, and/or phrases from the audio clip file 132 (which collectively may be referred to as generated keywords) and append the generated keywords to the audio file message 130 in addition to the frequency band identifiers and spectral flatness values. It is understood that information appended to the initial audio file message 130 (e.g., any of the generated spectral flatness value, frequency band identifier, generated keywords, time bin identifiers, etc.) may be referred to as appended information 136. The appended audio file message 130 may be assigned to a voice matrix based on metadata originally included in the audio clip message and/or appended information 136 (e.g., any of frequency band identifiers, spectral flatness values, and/or keywords appended via speech recognition). In some embodiments, the appended audio file message 130 may be saved to the non-transitory memory of audio clip data store 114, which may comprise a history of updates to audio clip messages (i.e., copies of the audio clip messages in their original state and any appended information to the audio clip message).

In response to an audio file message 130 being appended (e.g., with appended information 136), the network server 120 may access network data store 150 to assign the appended audio file message 130 (i.e., the audio clip message after it has been appended with appended information 136) to a voice matrix 152 stored in the non-transitory memory of network data store 150. In an embodiment, audio clip messages (e.g., 130) may be assigned to voice matrices 152 by the network server 120 identifying information from the metadata 134 (e.g., a user identifier, unique identifier, etc.) and/or appended information 136. If there is a "match" between information from a voice matrix 152 and the appended audio file message 130, the network server 120 may assign the appended audio file message 130 to the voice matrix 152. It is understood that the use of the term "match" does not indicate that a 100% correlation is necessary, but rather the application 126 may configure the network server 120 to determine that a correlation exists above a defined percentage (e.g., 75%, 90%, or another percentage), where the correlation is between the frequency band identifiers, spectral flatness values, and/or metadata appended to the audio file message 130 and the information within a particular voice matrix 152. Put another way, the network server 120 may determine that the audio clip file 132 includes an audio signal (i.e., recorded sounds in the audio clip file 132) having frequency band identifiers and/or spectral flatness values that are shared (above the predefined percentage) with frequency band identifiers and/or spectral flatness values of the voice matrix 152 of a user having user profile 154. The network server 120 may assign the appended audio file message 130 by determining whether frequency band identifiers and/or spectral flatness values are associated with each other (i.e., if they match and/or are within a defined degree of separation, such as the values being within 10% of each other), and if so, then the audio clip message may be assigned to a voice matrix 152. In an embodiment, assignment to a voice matrix 152 may include creating (in a data structure of the voice matrix 152) an entry that is a pointer reference to the appended audio clip 130 and may include an identification of the appended audio file message 130.

A voice matrix 152 may comprise information about a user's voice, thereby allowing the network server 120 to determine whether the audio clip file 132 has recorded sounds that are a capture of the user's voice. Specifically, each user may have their own voice matrix 152 created by network server 120, where the voice matrix 152 comprises frequency band identifiers, spectral flatness values, and/or generated keywords that correspond with a user's voice. In some embodiments, the network server 120 may build a voice matrix for a user by compiling recorded sounds of the user's voice, frequency band identifiers, and/or spectral flatness values. In some embodiments, the network server 120 may determine that a voice matrix 152 already exists and may create additional entries in voice matrix 152 for the frequency band identifiers and/or spectral flatness values determined by the application 126. For example, in addition to the frequency band identifiers and spectral flatness values already existing in the user's voice matrix 152, the network server 120 may update the voice matrix with a new band identifier because the user was recorded as making a sound having a frequency that was not previously associated with the user's voice matrix 152.

Each voice matrix 152 may be associated with a user profile 154 stored in network data store 150. The network server 120 may identify and pull a user profile 154 using a user identifier (or other information in metadata 134) that is shared between the user profile 154 and voice matrix 152. Each user profile 154 may store information (e.g., keywords) revealing what its associated user (i.e., the person the user profile identifies) is interested in, such as off road trucks, a certain breed of dogs, or cleaning products. This information may be stored in the user profile 154 via a string of characters that define words, phonemes, and/or phrases associated with the user. In some embodiments, the application 126 may configure the network server 120 to update the user profile 154 with the appended information 136 (e.g., words identified via speech recognition). For example, based on the audio clip file 130, voice matrix 152, and/or the user profile 154, the network server 120 may update and/or create entries in the user profile 154 with keywords, phonemes, and/or phrases included with the appended information 136 and these entries correspond with a user's interest. Audio objects 156 may have metadata with embedded tags that include keywords corresponding to the content that the audio object plays (e.g., tags for cars, guitars, clothing, etc.). The updated and/or existing entries in the user profile 154 may be used to determine which audio objects 156 would be relevant to the user based on a match with embedded tags of the audio object 156.

Thus, the network server 120 may determine the identity of user equipment that belongs to a user corresponding to the recorded sounds in the audio clip file 132 based on the voice matrix 152 and/or user profile 154. In some embodiments, the user equipment which is identified did not provide the audio clip message to the network server 120. This means that the recording device 103 which recorded the audio clip file 132 (which was analyzed by the network server 120) is a separate device than the user equipment identified by the network server 120. For example, if the network server 120 determines that Bob is the person that was recorded on his brother's recording device, Bob's voice matrix will reference Bob's user's profile stored in network data store 150, which in turn identifies a unique identifier for Bob's UE (e.g., a smart phone) and not Bob's brother's recording device (which provided the audio clip message that was analyzed by the network server). The identification of a UE in the user profile 154 may be used in order to initiate delivery of audio objects 156 to the identified UE.

The entries in the user profile 154 and/or appended information 136 may form a basis for the network server 120 selecting and providing audio objects 156 to a device of a user (e.g., a user's UE 102). The network server 120 and/or content server 112 may pull an audio object 156 from network data store 150 based on audio object 156 having embedded tags with keywords that are associated with and/or matching the user profile's 154 keywords (which may have been determined and/or updated via speech recognition). In some embodiments, audio objects 156 may be identified, selected, and/or initiated for delivery based on the appended keywords from the audio clip file 132 (determined via speech recognition). For example, new, updated, and/or existing entries of the user profile 154 may have keywords revealing that the user is interested in a certain breed of dog or replacement vacuum bags for a certain brand of vacuum that was recognized by the network server 120 as being owned by the user (through speech recognition of the audio clip file 132). Based on the user profile's 154 keywords associated with a dog breed, the network server 120 may retrieve audio objects 156 from network data store 150 (or via a request to content server 112 acting as an intermediary and controller of audio objects 156), where the audio objects 156 pertain to the dog breed, such as a being associated with a brand of dog food, a local veterinarian, pet insurance, etc.

Using the identification of the user equipment 102, the application 126 may configure network server 120 to initiate delivery of the audio object 156 to the identified user equipment 102. In an embodiment, initiating delivery by the network server 120 includes the network server 120 selecting an audio object 156 from the network data store 150, creating a message that comprises the audio object 156, and transmitting the selected audio object 156 via the network 110. The audio object 156 may be delivered to a device that did not record the sounds in the audio clip file and provide the audio clip message to the network server 120. For example, recording device 103 may have recorded sounds in an environment and transmitted an audio clip message for storage in audio clip data store 114. When the network server 120 is at the point to initiate delivery of audio objects, the audio objects may be targeted for UE 102 and not recording device 103. In some embodiments, the recording device that provided the audio clip message to the network server 120 may be the intended target for delivery of audio objects. In an embodiment, initiating delivery of audio objects by the network server 120 includes the network server 120 relaying the audio objects and/or an identification of the audio objects to content server 112 prior to the audio object being received by the targeted device (e.g., UE 102). If the audio object itself is provided to the content server 112 by the network server 120, then the content server 112 may include the audio object(s) with additional content (e.g., other audio content such as streaming music, audio visual content such as videos, and/or visual content such as web pages) that is sent to a target device (e.g., any of UE 102-102n, recording device 103-103n, etc.). If the network server 120 provides content server 112 with an identification of the audio objects to be included with additional content, then the content server 112 may retrieve the identified audio object from network data store 150 and/or another communicatively coupled data store. In some embodiments, the content server 112 may be an intermediary for delivery of audio objects between the network server 120 and devices that are configured to receive audio objects (e.g., UE 102-102n, recording devices 103-103n).

In some embodiments, initiation of delivery and/or the commencement of delivery of the audio object 156 to the UE 102 may be in response to a triggering event. A triggering event may include, but is not limited to, any of the following examples labeled I-III. (I) A triggering event may be the network server 120 determining that the user equipment (which the audio object 156 is intended for) is executing a mobile application that is configured to play the audio object, where the mobile application may request one or more audio objects (e.g., audio object 156) to play back at a defined time (e.g., playing the audio object in between songs, before allowing the user to watch audio-visual content, at defined intervals within audio and/or visual content, etc.). Upon determining that the mobile device is being executed on the UE 102, the network server 120 may initiate delivery by sending the audio object 156 via the network 110 to the UE 102. (II) A triggering event may be the network server 120 being informed (e.g., via information received via access nodes 104-104n) that the user equipment 102 is within a predefined location on the network 110. For example, the network server 120 may detect that a user is sitting in traffic and approaching the location of a retail store that carries merchandise associated with the keyword pertaining to the audio object 156. The network server 120 may initiate delivery of the audio object 156, and may deliver the audio object 156, to the UE 102 which may be played back via a communicatively coupled speaker of the UE 102. When the audio object 156 is executed by a processor of UE 102, it may inform and/or remind the user of information that is of interest to the user, such as if the audio object 156 pertains to dog food being on sale at a local store up ahead (where the audio object 156 was selected because the recorded audio clip file 132 was determined to comprise keywords indicating that the user may need to replenish dog food). (III) A triggering event may be the network server 120 may receive a request for one or more audio objects from an application executing on the user equipment 102. For example, the network server 120 may have an audio object 156 selected for the UE 102 but has not yet transmitted it. When a mobile application launches on the UE 102, it may make a request for an audio object, and in turn, the network server 120 may send the audio object 156 via the network 110 to the mobile application of the UE 102.

Figure 2:
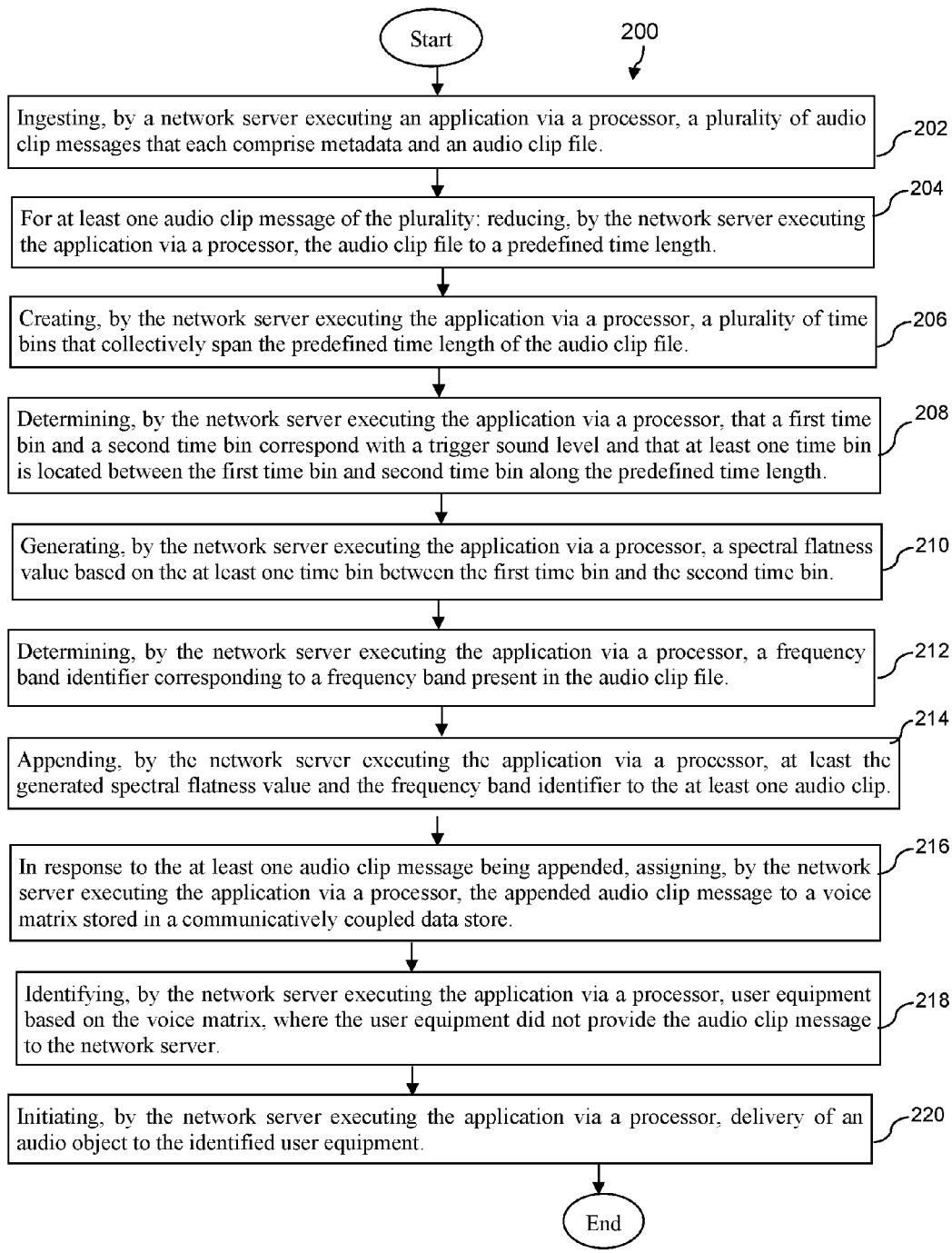
FIG. 2 illustrates an example method according to an embodiment of the disclosure.
Figure 3:
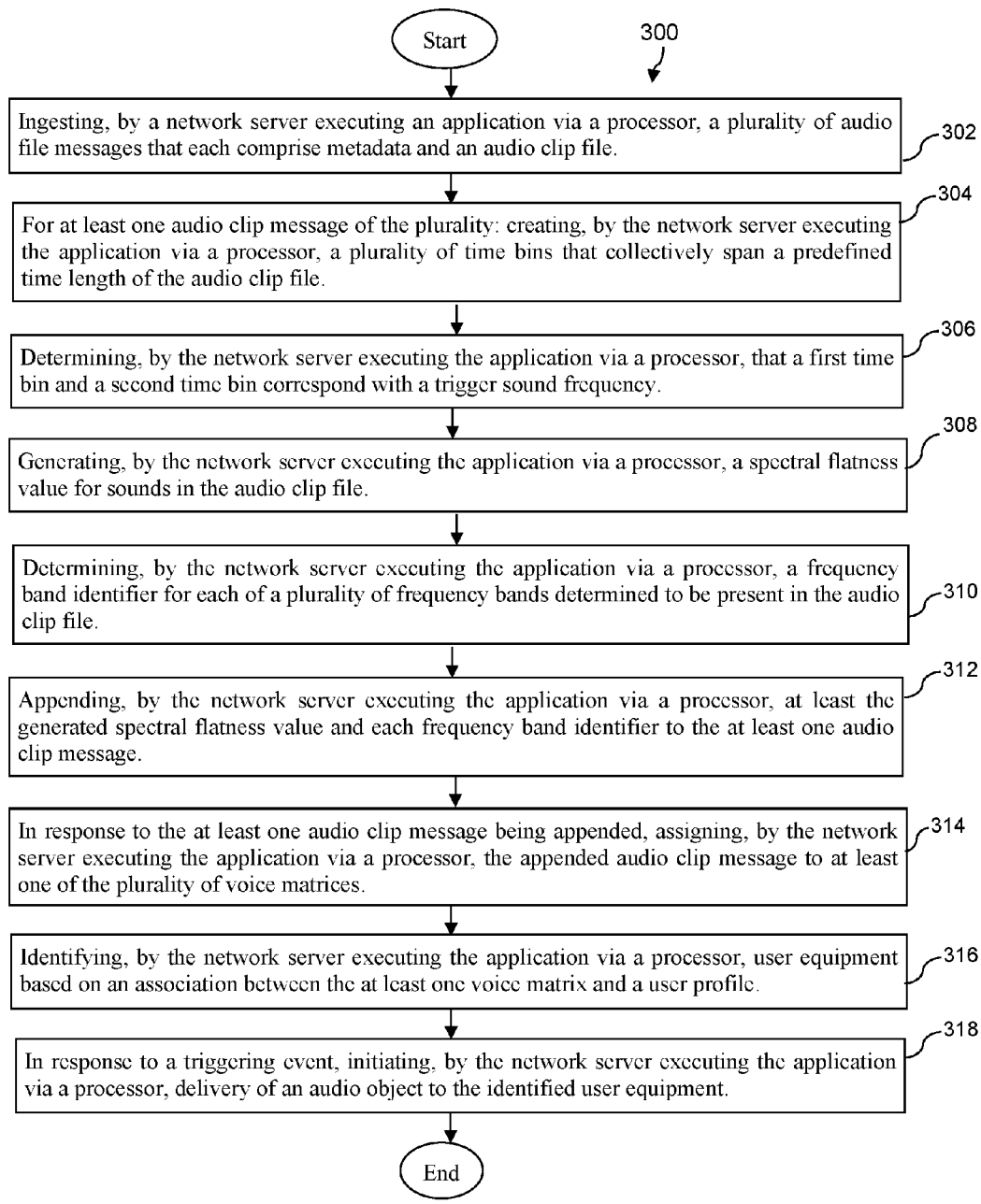
FIG. 3 illustrates an example method according to another embodiment of the disclosure.

FIGS. 2 and 3 are flowcharts of example method 200 and method 300, respectively, for audio object delivery based on audible frequency analysis. The methods 200 and 300 may be implemented, in whole or in part, by embodiments disclosed herein, such as application 126 that configures a processor of network server 120 in system 100 of FIG. 1A, or another suitable non-generic particular machine and/or within a non-generic system such as discussed with respect to FIGS. 4-7. For this and other features and methods disclosed herein, the operations performed configure devices into particular machines and the operations performed in the methods may be implemented in differing order. Furthermore, the recited operations are only provided as examples, and some of the operations may be optional, combined into fewer operations, supplemented with other operations, or expanded into additional operations without detracting from the essence of the disclosed implementations.

Turning now to FIG. 2 with reference to features discussed in FIGS. 1A-1C, a method 200 for audio object delivery based on audible frequency analysis is disclosed. In general, method 200 may be performed by at least the execution of application 126 on a processor (e.g., processor 122) that configures a server (e.g., network server 120).

At step 202, the method 200 comprises ingesting, by a network server executing an application via a processor, a plurality of audio clip messages that each comprise metadata and an audio clip file. The plurality of audio clip messages may have been generated by a recording device and sent to an audio clip data store via a communications network. Ingesting the plurality of audio clip messages 130 may include the application 126 receiving the audio clip messages (e.g., from non-transitory memory of an audio clip data store 114), creating a queue in which each of the received audio clip messages are placed, and selecting at least one audio clip message for analysis. In some embodiments, the network server is ingesting audio clip messages in groups, where each group is related to each other, such as based on being recorded by the same recording device as indicated in metadata of each of the plurality of audio clip messages ingested. The metadata may comprise one or more of: a user identifier, unique identifier, uniform resource locator (URL) address, time stamp, date stamp, recording device indicator, user profile identifier, location information, or any combination thereof.

At step 204, the method 200 continues with the network server conducting audible frequency analysis for at least audio clip message that is ingested by the network server. The method 200 includes reducing, by the network server executing the application via a processor, the audio clip file to a predefined time length. For example, the audio clip file 132 within the audio file message 130 may initially have recorded signals (i.e., recorded sounds) that span thirteen seconds in length. The application 126 configures the network server 120 to reference a predefined time length definition that specifies audio clip files to be analyzed in overall segments no greater than ten seconds in length. Thus, the application 126 configures the network server 120 such that it is reducing the audio clip file to the predefined time length (e.g., ten seconds).

At step 206, the method 200 includes creating, by the network server executing the application via a processor, a plurality of time bins that collectively span the predefined time length of the audio clip file. Continuing with the example of the predefined time length being ten seconds, the network server creates multiple time bins that collectively span from zero seconds to ten seconds. In some embodiments, each time bin spans approximately the same amount of time. For example, each time bin may span two seconds in length, thus if the audio clip file is reduced to the predefined length of ten seconds, then the network server would be creating five time bins with each being two seconds in length. The network server may assign a time bin identifier to each time bin, such as values "1" through "5" for the above example.

At step 208, the method 200 includes determining, by the network server executing the application via a processor, that a first time bin and a second time bin correspond with a trigger sound frequency and that at least one time bin is located between the first time bin and second time bin along the predefined time length. The trigger sound frequency may be determined by the network server based on a predefined value stored in memory, and the trigger sound frequency may be measured in units of hertz (Hz). In some embodiments, the trigger sound frequency is not greater than 20 Hz. The network server may determine that a time bin corresponds with a trigger sound frequency when the sound frequencies pertaining to the time bin are at or above the trigger sound frequency. Time bins that have no recorded sounds and/or recorded frequencies below the trigger sound frequency indicate to the network server that these frequencies should not be included in the analysis. However, frequencies above the trigger sound frequency may be included in the analysis. For example, if the audio clip file has five time bins (each two seconds in length), the network server may label the five time bins with time bin identifiers "1" through "5" sequentially. If time bins with time bin identifiers "2", "3", and "4" each contain sound frequencies at or above the trigger sound frequency, then the network server determines that time bins with identifiers "2". "3", and "4" each correspond with the trigger sound frequency.

At step 210, the method 200 includes generating, by the network server executing the application via a processor, a spectral flatness value based on at least one time bin between the first time bin and the second time bin. The spectral flatness value may be generated by the network server 120 for frequencies that are above the trigger sound frequency. The network server may compare the generated spectral flatness value with reference spectral flatness values stored in memory in order to determine whether the generated spectral flatness value was from human speech or a machine/device in the environment. If the generated flatness value pertains to human speech (e.g., being below a spectral flatness value), then the network server may store that flatness value and continue with determination of frequency bands in the time bin.

At step 212, the method 200 includes determining, by the network server executing the application via a processor, a frequency band identifier corresponding to a frequency band present in the audio clip file. In an embodiment, the network server may determine a frequency band identifier for frequencies that have spectral flatness values that are below a spectral flatness threshold (thus indicating that the recorded sounds pertain to sounds from a human and not generated by a machine or equipment). Each frequency band identifies a range of frequencies that are recorded in the audio clip file. A frequency band is present in the audio clip file when frequencies are recorded in the audio clip file and are within the range defined by that particular frequency band. The network server may determine the frequency band identifiers for each frequency band in which the audio clip file has frequencies. For example, if recorded sounds in the audio clip file have frequencies that indicate a low spectral flatness value (i.e., below spectral flatness threshold) and range between 70 Hz and 100 Hz, then the network server may identify which frequency bands cover the frequencies from 70 Hz to 100 Hz. The application 126 may be configured such that three frequency bands exist for frequencies between 70 Hz to 100 Hz, such as one frequency band for 70 Hz-80 Hz, another frequency band for 80 Hz-90 Hz, and yet another frequency band for 90 Hz-100 Hz. Thus, in this example, the network server 120 may determine the frequency band identifiers for each of these three frequency bands.

At step 214, the method 200 continues with appending, by the network server executing the application via a processor, at least the generated spectral flatness value and the determined frequency band identifier(s) to the at least one audio clip message that has undergone the analysis. In some embodiments, the network server 120 may include additional information, such as discussed above with respect to system 100 and the appended information 136.

Continuing with an embodiment of method 200 at step 216, in response to the at least one audio clip message being appended, assigning, by the network server executing the application via a processor, the appended audio clip message to a voice matrix stored in a communicatively coupled data store. For example, the network server 120 may compare the spectral flatness values, frequency band identifiers, and metadata from the audio clip message to voice matrices which are stored in a network data store. When a match exists between the appended information of the audio clip message and a voice matrix, then the network server 120 may assign the audio clip message to the voice matrix. Thus, the appended audio clip message may be assigned to a voice matrix based at least on any of: a frequency band identifier(s), spectral flatness value(s), metadata, or any combination thereof. In some embodiments, the network server may have performed speech recognition on the frequencies within the audio clip file, and may have generated keywords based on the speech recognition. The network server 120 may update the voice matrix assigned to the audio clip message using the generated keywords. The voice matrix may also be updated with frequency band identifiers that may be newly determined as being associated with the voice signature of the person who was recorded in the audio clip file.

At step 218, the method 200 includes identifying, by the network server executing the application via a processor, user equipment based at least on the voice matrix. In some embodiments, the voice matrix may comprise a unique identifier for user equipment and/or a reference to a user profile. The network server may determine which user profile corresponds with the voice matrix by detecting a user identifier (or other information in metadata of the audio clip message) shared between the voice matrix and the user profile. The user profile may be stored in a network data store or other memory that is accessible to the network server. In some embodiments, the user equipment which is identified based on the voice matrix and/or user profile may not necessarily be the same device which recorded the audio clip message that was provided to the network server. For example, the recording device 103 may be located in a user's home whereas the UE that was identified by the network server is a smart phone of the same and/or different user. Thus, in this example, the UE identified may belong to a person that was visiting her friend's house, and the person's voice was recorded by her friend's recording device. As such, the user equipment identified need not be the device that recorded the audio clip file and/or provide the audio clip message to the network server.

At step 220, the method 200 includes initiating, by the network server executing the application via a processor, delivery of an audio object to the identified user equipment. Initiating delivery by the network server 120 may, in an embodiment, include the network server 120 selecting an audio object 156 from the network data store 150, creating a message that comprises the audio object 156, and transmitting the selected audio object 156 via the network 110. In some embodiments, the network server may create a message that comprises an identification of the audio object that is selected for delivery to the identified user equipment. In an embodiment, the created message does not comprise the audio object itself, but does comprise the identification of the audio object. In this embodiment, the network server may send the created message to a content server via the network. The content server may be an intermediary device that receives the created message, pulls an audio object based on the audio object identifier sent from the network server. In some embodiments, the content server may send the audio object to the identified UE. In an alternate embodiment, the content server may send the retrieved audio object back to the network server. When the network server has obtained the audio object (whether it be due to the network server pulling the audio object on its own or via the content server), the network server may deliver the audio object to the identified UE via the network.

In some embodiments, initiating delivery of an audio object to the identified user equipment may be in response to occurrence of a triggering event. A triggering event may include any of: the network server determining that the user equipment executing a mobile application that is configured to play the audio object; the network server determining that the user equipment is within a predefined location within the telecommunications network; the network server receiving a request for one or more audio objects from an application executing on the user equipment; or any combination thereof.

Turning now to FIG. 3, with reference to features discussed in FIG. 1A-1C, a method 300 for audio object delivery based on audible frequency analysis is disclosed. Method 300 may be performed by at least the execution of application 126 on a processor (e.g., processor 122) of a server (e.g., network server 120). At step 302, the method 300 includes ingesting, by a network server executing an application via a processor, a plurality of audio clip messages that each comprise metadata and an audio clip file. The audio clip messages may be stored in non-transitory memory of an audio clip data store that is communicatively coupled to the network server. The network server may ingest the plurality of audio clip messages by receiving and/or retrieving the audio clip messages from the audio clip data store. The audio clip file(s) may have been generated by a recording device that recorded sound frequencies that were produced within an environment of the recording device's location. The recording device communicatively couples to a network and the recording device may have transmitted the audio clip file(s) within an audio clip message via the network. The audio clip message(s) may have been stored in the audio clip data store until being ingested by the network server.

In response to the ingesting the audio clip messages, the network server may initiate audible frequency analysis for at least one audio clip message of the plurality. For example, at step 304, the method 300 includes creating, by the network server executing the application via a processor, a plurality of time bins that collectively span a predefined time length of the audio clip file. Each time bin pertains to a specific portion of the audio clip file along the predefined time length. For instance, if the audio clip file has a predefined time length of ten seconds, then the network server may create five time bins that are each two seconds in length. In an embodiment, at least one time bin may span more or less time than the other time bins.

The method 300 continues at step 306 with determining, by the network server executing the application via a processor, that a first time bin and a second time bin correspond with a trigger sound frequency. The first time bin and second time bin are among those created in the plurality of time bins. The network server 120 may determine that at least these two time bins (i.e., the first and second time bin) correspond with the trigger sound frequency because each of these time bins have sound frequencies that are at or above the trigger sound frequency. Having frequencies above the trigger sound frequency indicates that recorded sounds may pertain to a human voice. The network server may continue the method 300 with the determination of whether the sound frequencies were generated by a human's voice or by devices in the background of the recorded environment, specifically by at least analyzing a spectral flatness value of the signal. In an embodiment, the trigger sound frequency is not greater than 20 hertz.

At step 308, the method 300 includes generating, by the network server executing the application via a processor, a spectral flatness value for sounds in the audio clip file. For example, if five time bins were created and two of the five time bins had sound frequencies above the trigger level, then the network server may generate spectral flatness values for the frequencies that are recorded within the two time bins. In some embodiments, the network server may be determining whether generated spectral flatness values are below a spectral flatness threshold. The spectral flatness threshold may indicate to the network server that spectral flatness values below the spectral flatness threshold are likely to have been generated by a human voice and not by equipment or a device that makes sounds. For example, the audio clip file may have sound frequencies in two time bins and these sound frequencies are coming from two different voices. To distinguish whether the audio clip file has recorded one or more humans located in the environment of the recording device and/or has recorded a device producing sounds of human voices (e.g., the television playing sounds of a news anchor through the television's electronic speakers), the network server may rely on the spectral flatness values generated for each of these frequencies. Specifically, the network server may be determining that the spectral flatness value is below the spectral flatness threshold in order to confirm that the sound frequencies are not from a device but rather a human's voice.

At step 310, the method 300 includes determining, by the network server executing the application via a processor, a frequency band identifier for each of a plurality of frequency bands determined to be present in the audio clip file. A plurality of frequency bands (each with their own identifier) may be defined in memory of the network server. Each frequency band spans a predefined set of audible frequencies. One frequency band identifier exists for each frequency band. The network server may compare the frequencies present in the audio clip file with those of the frequency bands in order to determine which frequency bands the sound frequencies fall within. For example, the network server may determine that sound frequencies (that are above the trigger sound frequency) are recorded as fluctuating between 120 Hz and 135 Hz. The network server may determine that frequency bands exist in memory such that one frequency band is for frequencies spanning 120 Hz to 130 Hz, and another frequency band exists for frequencies spanning 130 Hz to 140 Hz. In this example, because the recorded frequencies fluctuate between 120 Hz to 135 Hz, the network server determines two frequency band identifiers (i.e., one frequency band identifier for the frequency band spanning 120 Hz to 130 Hz, and one frequency band identifier for the frequency band spanning 130 Hz to 140 Hz). In an embodiment, the network server may reference the frequency band identifier(s) to determine whether frequencies are below the trigger sound frequency.

At step 312, the method 300 includes appending, by the network server executing the application via a processor, at least the generated spectral flatness value and each detected frequency band identifier to the at least one audio clip message. In some embodiments, the network server may append frequency band identifiers to audio clip messages only when the corresponding frequencies have a spectral flatness value that is below the spectral flatness threshold. For example, even though the network server may have determined that the sound frequencies are above the trigger sound frequency and that they correspond with frequency bands that are typically associated with a human's voice (e.g., frequency bands between 60 Hz and 300 Hz), the network server may determine that these frequencies have a high spectral flatness value (i.e., above the spectral flatness threshold). If the spectral flatness value is above the spectral flatness threshold, then the network server may not append the frequency band identifiers for those frequencies because the network server has determined that the source of the frequencies likely did not originate from a human, but rather from equipment or a device (e.g., a television producing sounds of human speech). Thus, in some embodiments, the network server may be appending the spectral flatness value(s) and frequency band identifier(s) only for frequencies whose spectral flatness values are below the spectral frequency threshold. By this, in an embodiment, appending information to the audio clip message may be in response to the network server determining that the spectral flatness value for sounds within the time bin are below the spectral flatness threshold. It is understood that the audio clip message may be referred to as an appended audio clip message once information (e.g., appended information 136) has been added to it.

At step 314, in response to at least one audio clip message being appended, assigning, by the network server executing the application via a processor, the appended audio clip message to at least one of the plurality of voice matrices. The network server may access a network data store and search voice matrices for a match between information contained in the metadata of the appended audio clip message and the information contained in the voice matrices. For example, a unique identifier (or other information included in metadata 134) of the recording device 103 may be contained in the metadata of the appended audio clip message. If one or more matches is found using the metadata, the network server may then compare frequency band identifiers and spectral flatness values contained in the voice matrix with those contained in the appended audio clip message. If there is a match and/or overlap between them, then the network server may assign the appended audio clip message to at least that voice matrix. In an embodiment where there exist multiple voice recorded in the audio clip file, the appended audio clip message may be assigned to each voice matrix that is identified as pertaining to a user's voice that was recorded in the audio clip file.

At step 316, the method 300 continues with identifying, by the network server executing the application via a processor, user equipment. In some embodiments, the identification by the network server may be based on an association between the at least one voice matrix and a user profile. In some embodiments, voice matrices and user profiles may be stored in non-transitory memory of a communicatively coupled data store. The data store may be more than one storage device that is remote and/or co-located with the network server. The network server may detect an association between the at least one voice matrix and the user profile based on information shared between them (e.g., a user identifier).

At step 318, the method 300 continues with initiating, by the network server executing the application via a processor, delivery of an audio object to the identified user equipment, where the initiating is in response to a triggering event occurring. A triggering event may include any of: the network server determining that the user equipment is executing a mobile application that is configured to play the audio object; the network server determining that the user equipment is within a predefined location within the telecommunications network; the network server receiving a request for one or more audio objects from an application executing on the user equipment; or any combination thereof. Initiating delivery of an audio object includes the network server identifying which audio object should be sent to the identified user equipment. In an embodiment, the network server may pull an audio object from its storage in memory and transmit the audio object to the identified user equipment via the network. In another embodiment, the network server may send a request to a content server for the content server to retrieve an audio object that is identified in the request. In some embodiments, the content server may receive the request and pull an audio object based on the identification in the request. In some embodiments the content server may send a return message comprising the audio object back to the network server, and the network server will then deliver the returned audio object to the identified user equipment. In another embodiment, the content server may proceed with delivering the retrieved audio object in response to pulling the audio object from memory.

Figure 4:
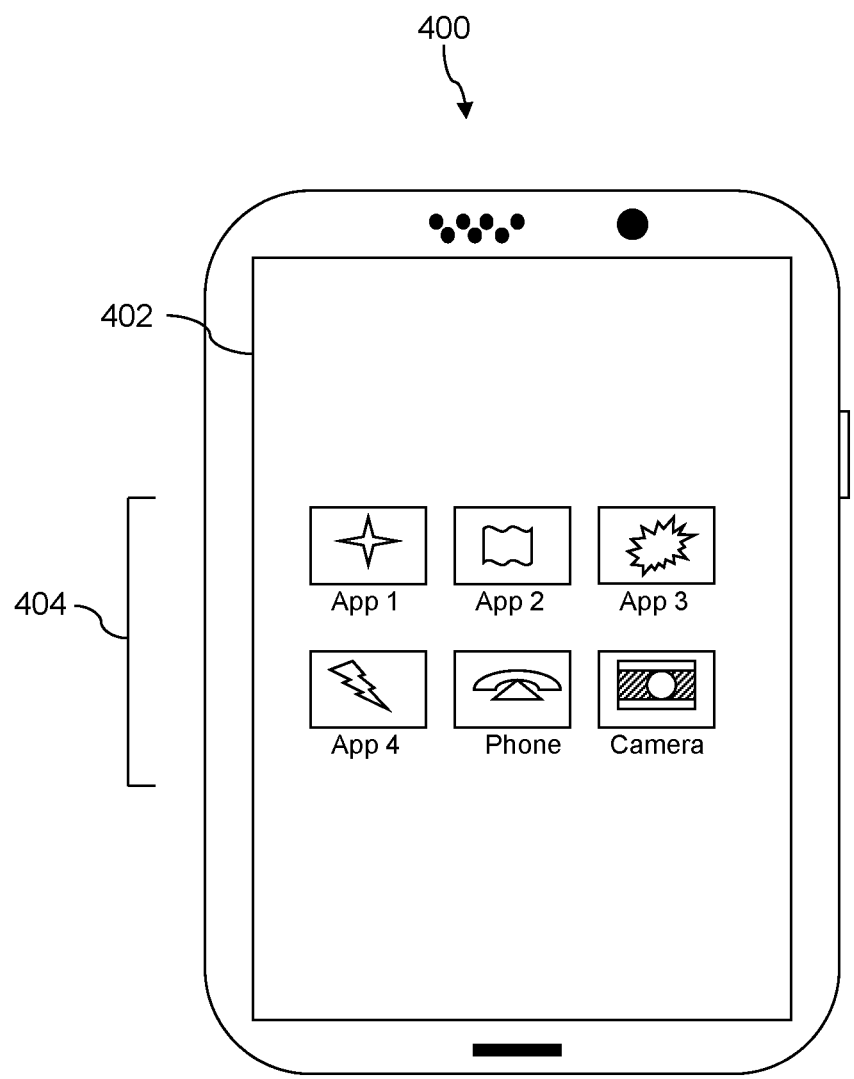
FIG. 4 is an illustration of a user equipment according to an embodiment of the disclosure.

FIG. 4 depicts an embodiment of user equipment (UE) 400, which is operable for implementing aspects of the present disclosure, but the present disclosure should not be limited to these implementations. Though illustrated as a mobile smart phone, the UE 400 may take various forms including, but not limited to, a wireless handset, a wearable device, a personal digital assistant (PDA), a gaming device, or a media player. The UE 400 may be an example of an embodiment of the UE 102 discussed above with reference to FIG. 1A. In some embodiments, the UE 400 may have a microphone and be configured as a recording device 103 discussed above with reference to FIG. 1A. The UE 400 includes a display 402 which may have a touch-sensitive surface for input by a user. A number of application icons 404 are illustrated within the touch screen display 402. It is understood that in different embodiments, any number of application icons 404 may be presented in the touch screen display 402. Some of the application icons 404 may be associated with applications installed in non-transitory memory of the UE and may be configured based on the individual profile, demographics, and/or history of a user associated with the UE 400.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the equipment. The UE 400 may further execute one or more software or firmware applications in response to user commands.

These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
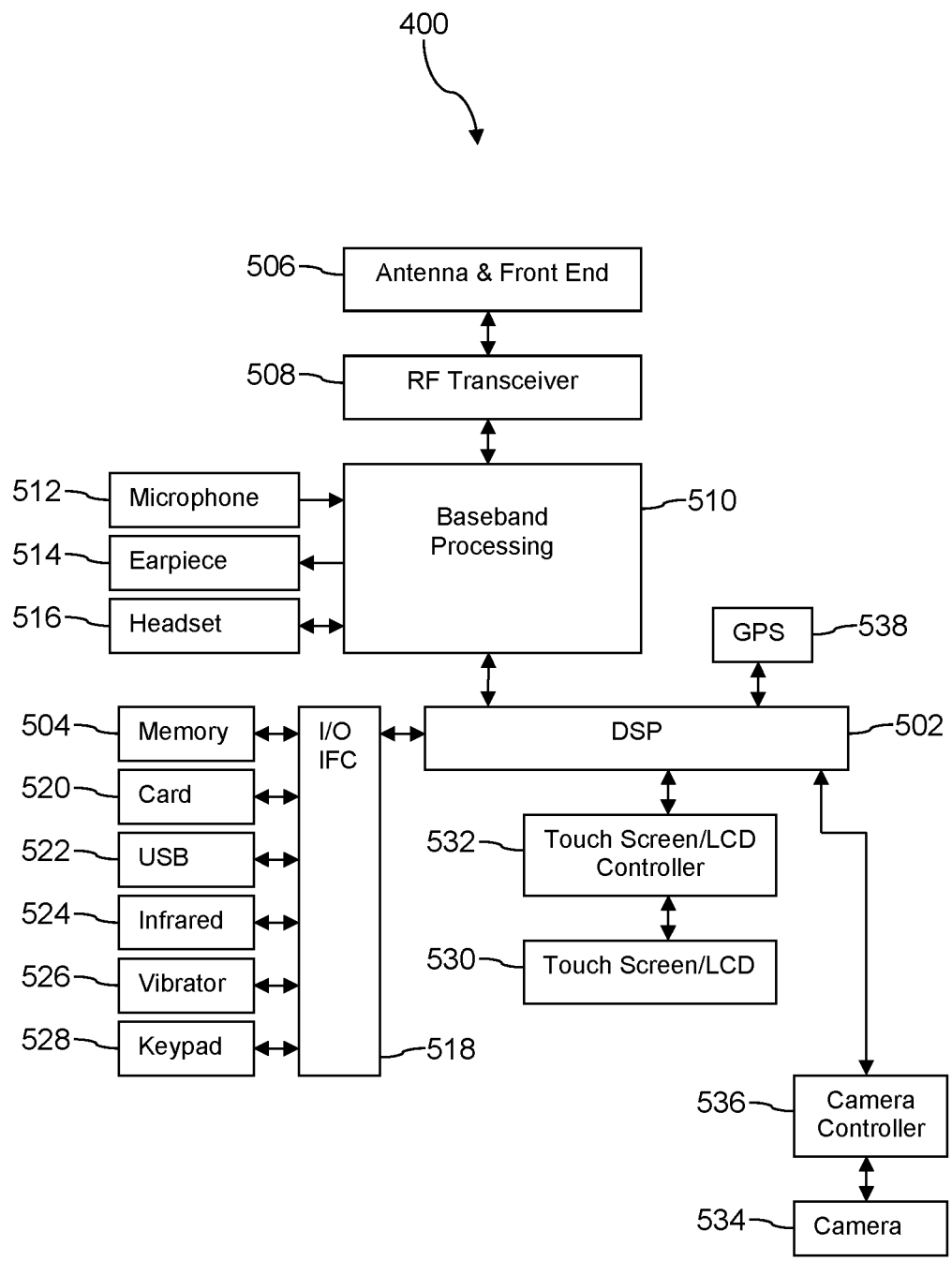
FIG. 5 is a block diagram of a hardware architecture of a user equipment according to an embodiment of the disclosure.

FIG. 5 shows a block diagram of circuitry in an embodiment of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the UE 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the UE 400 to determine its position.

Figure 6A:
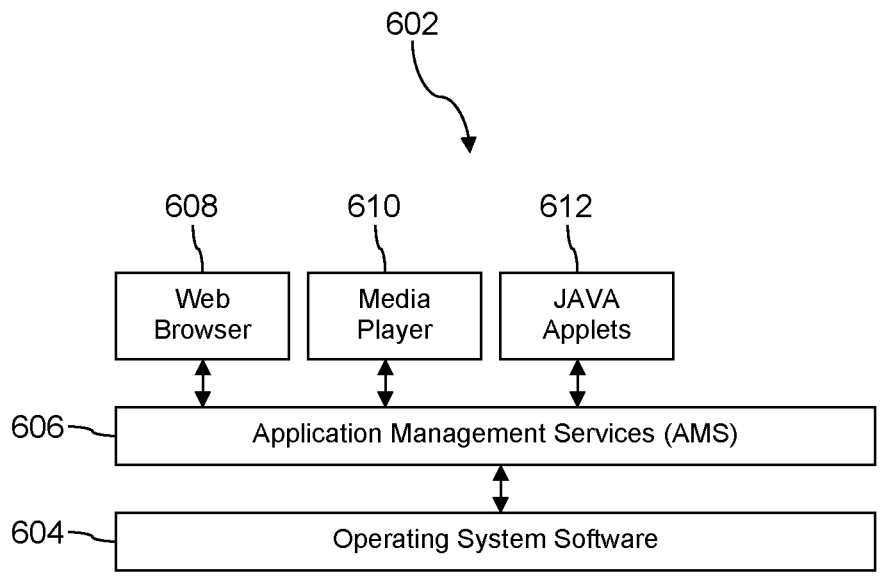
FIG. 6A is a block diagram of a software architecture of a user equipment according to an embodiment of the disclosure.

FIG. 6A illustrates a software environment 602 that may be implemented by the DSP 502, processors of a server (e.g., network server 120 and/or content server 112), and/or within an access node (e.g. access nodes 104 in FIG. 1). The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the mobile device 400 to provide a variety of functionality including games, utilities, and other functionality.

Figure 6B:
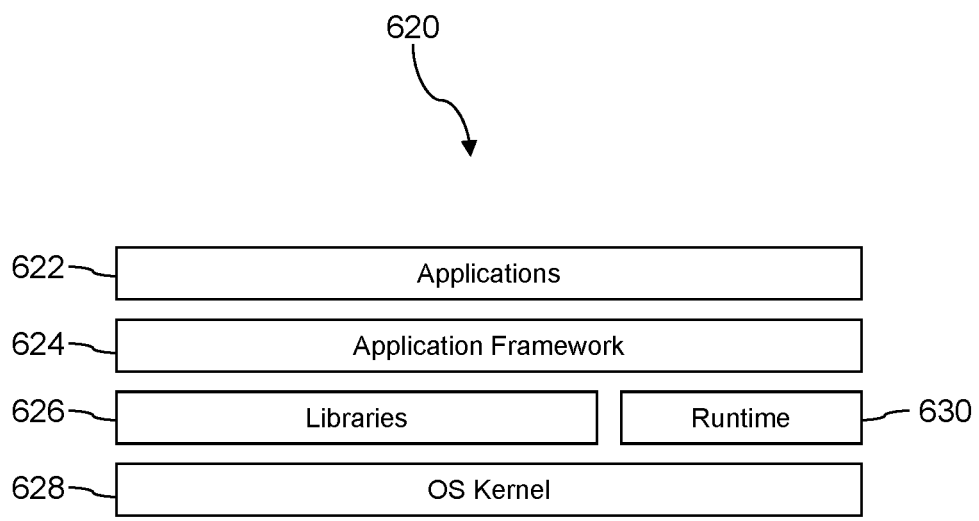
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630, which reside at the system level of the User Equipment and, in some embodiments, their content (e.g., destination addresses) may not be alterable via download and interaction of software from a server over a network. The DSP 502 executes applications 622 that may execute in the execution runtime 630 and may rely upon services provided by the application framework 624. Applications 622 and the application framework 624 may rely upon functionality provided via the libraries 626.

Figure 7:
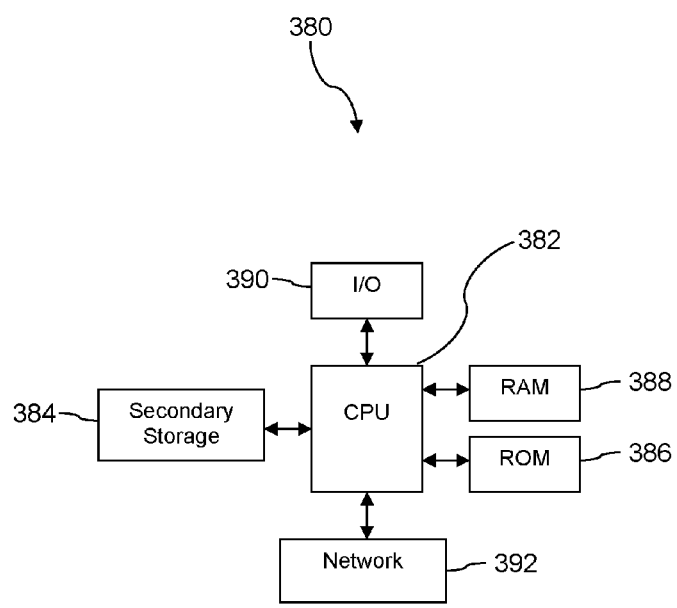
FIG. 7 illustrates an exemplary computer system suitable for implementing the several embodiments of the disclosure.

FIG. 7 illustrates a computer system 380 suitable for implementing one or more embodiments disclosed herein, such as features of system 100 in FIG. 1A, including one or more UE 102, recording device 103, network server 120, content server 112, audio clip datastore 114, network datastore 150, access node 104, and configured by features and steps disclosed in FIGS. 2 and 3. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. It is understood that use of the term "memory" or "storage" in the claims does not include transitory signals. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may be comprised on one or more non-transitory computer readable storage medium having computer executable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. The word "exemplary" is used herein to mean "serving as an example, instance, or illustration." Any implementation described herein as "exemplary" is not necessarily to be construed as preferred or advantageous over other implementations. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for audio object delivery based on audible frequency analysis, the system comprising:
a network server communicatively coupled to a telecommunications network, the network server comprising a non-transitory memory storing an application that, in response to execution, the network server:
ingests a plurality of audio clip messages that each comprise metadata and an audio clip file,
for at least one audio clip message:
reduces the audio clip file to a predefined time length,
creates a plurality of time bins that collectively span the predefined time length of the audio clip file,
determines that a first time bin and a second time bin correspond with a trigger sound frequency and that at least one time bin is located between the first time bin and second time bin along the predefined time length,
generates a spectral flatness value based on the at least one time bin between the first time bin and the second time bin,
determines a frequency band identifier corresponding to a frequency band present in the audio clip file,
appends, to the at least one audio clip message, the generated spectral flatness value and the frequency band identifier,
in response to the at least one audio clip message being appended, assigns the appended audio clip message to a voice matrix stored in a communicatively coupled data store,
identifies user equipment based on the voice matrix, where the user equipment did not provide the audio clip message to the network server, and
initiates delivery of an audio object to the identified user equipment.

2. The system of claim 1, wherein the appended audio clip message is assigned to the voice matrix based at least on the identifier of the frequency band.

3. The system of claim 1, wherein the trigger sound frequency is not greater than 20 hertz.

4. The system of claim 1, wherein the at least one time bin has frequencies that are greater than the trigger sound frequency.

5. The system of claim 1, wherein each time bin spans approximately the same amount of time.

6. The system of claim 1, wherein the metadata comprises one or more of a user identifier, a unique identifier, a uniform resource locator (URL) address, a time stamp, a date stamp, a recording device indicator, a user profile identifier, or a location information.

7. The system of claim 1, wherein the frequency band identifies a range of frequencies that are recorded in the audio clip file.

8. A method for audio object delivery based on audible frequency analysis, the method comprising:
- ingesting, by a network server executing an application via a processor, a plurality of audio clip messages that each comprise metadata and an audio clip file;
- for at least one audio clip message of the plurality:
  - reducing, by the network server executing the application via a processor, the audio clip file to a predefined time length;
  - creating, by the network server executing the application via a processor, a plurality of time bins that collectively span the predefined time length of the audio clip file;
  - determining, by the network server executing the application via a processor, that a first time bin and a second time bin correspond with a trigger sound frequency and that at least one time bin is located between the first time bin and second time bin along the predefined time length;
  - generating, by the network server executing the application via a processor, a spectral flatness value based on the at least one time bin between the first time bin and the second time bin;
  - determining, by the network server executing the application via a processor, a frequency band identifier corresponding to a frequency band present in the audio clip file;
  - appending, by the network server executing the application via a processor, at least the generated spectral flatness value and the frequency band identifier to the at least one audio clip message;
  - in response to the at least one audio clip message being appended, assigning, by the network server executing the application via a processor, the appended audio clip message to a voice matrix stored in a communicatively coupled data store;
  - identifying, by the network server executing the application via a processor, user equipment based on the voice matrix, where the user equipment did not provide the audio clip message to the network server; and
  - initiating, by the network server executing the application via a processor, delivery of an audio object to the identified user equipment.

9. The method of claim 8, wherein the appended audio clip message is assigned to the voice matrix based at least on the identifier of the frequency band.

10. The method of claim 8, wherein the trigger sound frequency is not greater than 20 hertz.

11. The method of claim 8, wherein each time bin spans approximately the same amount of time.

12. The method of claim 8, wherein the metadata comprises at least one of a user identifier, a unique identifier, a uniform resource locator (URL) address, a time stamp, a date stamp, a recording device indicator, a user profile identifier, a location information, or a combination thereof.

13. The method of claim 8, wherein the frequency band identifies a range of frequencies that are recorded in the audio clip file.

14. The method of claim 8, wherein initiating delivery of the audio object to the identified user equipment is in response to a triggering event.

15. A method for audio object delivery based on audible frequency analysis, the method comprising:
- ingesting, by a network server executing an application via a processor, a plurality of audio clip messages that each comprise metadata and an audio clip file;
- for at least one audio clip message of the plurality:
  - creating, by the network server executing the application via a processor, a plurality of time bins that collectively span a predefined time length of the audio clip file,
  - determining, by the network server executing the application via a processor, that a first time bin and a second time bin correspond with a trigger sound frequency,
  - generating, by the network server executing the application via a processor, a spectral flatness value for sounds in the audio clip file,
  - determining, by the network server executing the application via a processor, a frequency band identifier for each of a plurality of frequency bands determined to be present in the audio clip file,
  - appending, by the network server executing the application via a processor, at least the generated spectral flatness value and each frequency band identifier to the at least one audio clip message;
- in response to the at least one audio clip message being appended, assigning, by the network server executing the application via a processor, the appended audio clip message to at least one of the plurality of voice matrices;
- identifying, by the network server executing the application via a processor, user equipment based on an association between the at least one voice matrix and a user profile; and
- in response to a triggering event, initiating, by the network server executing the application via a processor, delivery of an audio object to the identified user equipment.

16. The method of claim 15, wherein the association between the at least one voice matrix and the user profile is based on sharing a user identifier.

17. The method of claim 15, wherein the triggering event comprises: determining that the user equipment executing a mobile application that is configured to play the audio object, the user equipment being within a predefined location of the telecommunications network, the network server receiving a request for one or more audio objects from an application executing on the user equipment, or any combination thereof.

18. The method of claim 15, wherein each frequency band identifier corresponds with one frequency band that spans a predefined set of sound frequencies.

19. The method of claim 15, wherein the trigger sound frequency is not greater than 20 hertz.

20. The method of claim 15, wherein the audio clip file is generated by a recording device that provided the audio clip message.

* * * * *